US006871400B2

(12) United States Patent
Kitahara

(10) Patent No.: US 6,871,400 B2
(45) Date of Patent: Mar. 29, 2005

(54) METHOD OF PRODUCING A LIQUID JETTING HEAD

(75) Inventor: Tsuyoshi Kitahara, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/634,923

(22) Filed: Aug. 6, 2003

(65) Prior Publication Data

US 2004/0025344 A1 Feb. 12, 2004

Related U.S. Application Data

(62) Division of application No. 09/761,760, filed on Jan. 18, 2001, now Pat. No. 6,631,980.

(30) Foreign Application Priority Data

Jan. 19, 2000 (JP) ........................................ 2000-10653

(51) Int. Cl.[7] ................................................ B23P 17/00

(52) U.S. Cl. ....................... 29/890.1; 29/25.35; 29/852; 29/846; 29/847; 29/851

(58) Field of Search ............................ 29/25.35, 890.1, 29/852, 846, 847, 851; 427/304, 508, 512, 510, 553, 555; 205/118, 122, 135, 136, 223; 347/68, 48, 70, 71–72; 216/27

(56) References Cited

U.S. PATENT DOCUMENTS

| | | | | | |
|---|---|---|---|---|---|
| 5,396,042 A | * | 3/1995 | Ishida et al. | 219/78.02 |
| 5,424,769 A | * | 6/1995 | Sakai et al. | 347/70 |
| 5,818,482 A | | 10/1998 | Ohta et al. | |
| 5,825,386 A | * | 10/1998 | Ohashi | 347/71 |
| 5,896,150 A | * | 4/1999 | Kobayashi et al. | 347/71 |
| 5,983,471 A | * | 11/1999 | Osawa | 29/25.35 |
| 6,139,132 A | | 10/2000 | Yasukawa et al. | |
| 6,195,882 B1 | * | 3/2001 | Tsukamoto et al. | 29/852 |
| 6,378,996 B1 | | 4/2002 | Shimada et al. | |
| 6,390,608 B1 | | 5/2002 | Mitsuzawa et al. | |

FOREIGN PATENT DOCUMENTS

| | | |
|---|---|---|
| EP | 0 830 945 A1 | 3/1998 |
| EP | 0 897 801 A1 | 2/1999 |
| EP | 0 950 525 A2 | 4/1999 |
| EP | 0 999 058 | 5/2000 |
| JP | 5-177834 A | 7/1993 |
| JP | 5-318735 A | 12/1993 |
| JP | 6-305142 A | 11/1994 |
| JP | 6-305142 | 11/1994 |
| JP | 8-85212 A | 4/1996 |
| JP | 8-142334 A | 6/1996 |
| JP | 8-169107 A | 7/1996 |
| JP | 8-187863 A | 7/1996 |
| JP | 9-123448 | 5/1997 |
| JP | 9-156096 A | 6/1997 |
| JP | 9-300635 | 11/1997 |
| JP | 11-147317 A | 6/1999 |

OTHER PUBLICATIONS

JPO Abstract 6–305142, Nov. 1, 1994.
JPO Abstract 9–300635, Nov. 25, 1997.

* cited by examiner

*Primary Examiner*—Peter Vo
*Assistant Examiner*—Tai Nguyen
(74) *Attorney, Agent, or Firm*—Sughrue Mion, PLLC

(57) ABSTRACT

A liquid jetting head of the invention includes a flowing-path plate through which a flowing-path space is formed as a flowing-path for a liquid. A nozzle plate is provided on one side surface of the flowing-path plate, said nozzle plate having a nozzle that is communicated with the flowing-path space. A sealing plate is provided on the other side surface of the flowing-path plate for sealing the flowing-path space. A portion of the other side of the flowing-path space forms a pressure-chamber space. A portion of the other side of the flowing-path plate including at least a portion of the pressure-chamber space is formed by electrocasting. A pressure-generating unit is provided at a portion of the other side of the sealing plate corresponding to the pressure-chamber space for changing a pressure of the liquid in the pressure-chamber space.

5 Claims, 25 Drawing Sheets

METHOD OF PRODUCING A LIQUID JETTING HEAD

CROSS-REFERENCE TO RELATED APPLICATIONS

This application is a divisional of allowed U.S. application Ser. No. 09/761,760, filed Jan. 18, 2001, now U.S. Pat. No. 6,631,980, which is incorporated by reference, herein, in its entirety.

FIELD OF THE INVENTION

This invention is related to a liquid jetting head, for example an ink-jetting recording head capable of jetting a drop of ink from a nozzle by means of vibration of a piezoelectric vibrating member in order to record images or characters on a recording medium. This invention is also related to a method of producing such a liquid jetting head.

BACKGROUND OF THE INVENTION

As shown in FIGS. 24 and 25, in general, a ink-jetting recording head using longitudinal-vibration type of piezoelectric vibrating members comprises a flowing-path unit 101 provided with a lot of nozzles 108 and a lot of pressure chambers 107. The flowing-path unit 101 is stuck onto a head case 102 containing the piezoelectric vibrating members 106.

In detail, the flowing unit 101 consists of a nozzle plate 103 through which the nozzles 108 are formed in two rows, a flowing-path plate 104 through which the pressure chambers 107 respectively communicating with the nozzles 108 are formed and a vibrating plate 105 that seals lower openings of the pressure chambers 107. The nozzle plate 103, the flowing-path plate 104 and the vibrating plate 105 are layered one on top of another as shown in FIGS. 24 and 25. In the flowing-path plate 104, ink reservoir spaces 109 are formed for storing ink that is introduced into the respective pressure chambers 107. In addition, ink paths 110 are formed in the flowing-path plate 104 for connecting the respective pressure chambers 107 and the ink reservoir spaces 109.

The head case 102 is made of a synthetic resin. The head case 102 has vertical through spaces 112. The piezoelectric vibrating members 106 are contained in the spaces 112. Tail ends of the piezoelectric vibrating members 106 are fixed to a fixing plate 111, which is attached to the head case 102. Leading surfaces of the piezoelectric vibrating members 106 are fixed to island portions 105A (see FIG. 25) of the vibrating plate 105, respectively.

When a driving signal generated in a driving circuit 114 is inputted to a piezoelectric vibrating member 106 through a flexible circuit board 113, the piezoelectric vibrating member 106 extends and contracts in a longitudinal direction thereof. When the piezoelectric vibrating member 106 extends and contracts, the corresponding island portion 105A of the vibrating plate 105 vibrates to change a pressure of the ink in the corresponding pressure chamber 107. Thus, the ink in the pressure chamber 107 may be jetted from the corresponding nozzle 108 as a drop of the ink. In addition, as shown in FIG. 24, ink supplying ports 115 for supplying the ink to the ink reservoir spaces 109 are formed through the head case 102 and the vibrating plate 105.

As the flowing-path plate 104 of the flowing-path unit 101, conventionally, a plate formed from a silicon mono-crystal substrate by an anisotropic etching process (see Japanese Patent Laid-Open No. 9-123448), a plate having a layer made of a photosensitive resin, and an electrocasting plate peeled off from a jig substrate (see Japanese Patent Laid-Open No. 6-305142 and Japanese Patent Laid-Open No. 9-300635) may be used.

In a case of forming a flowing-path plate 104 from a silicon mono-crystal substrate by an anisotropic etching process, pressure chambers 107 and ink-paths 110 are formed by the etching process. The etched silicon mono-crystal substrate (flowing-path plate 104) is layered with a metal nozzle plate 103 and a vibrating plate 105 via an adhesive material or the like.

However, in general, a linear expansion coefficient of silicon mono-crystal is different from a linear expansion coefficient of metal. Thus, in the flowing-path unit 101 consisting of the layered plates 103–105, a so-called "warp" may occur. This is not serious in the small-sized recording head, but this may result in difficulty in enlarging the size of the recording head.

In a case of forming a flowing-path plate 104 by layering a photosensitive resin on a substrate, there is a problem that a Young's modulus of the photosensitive resin (flowing-path plate 104) is lower than that of metal or silicon. That is, the photosensitive resin has only a lower rigidity. Thus, if the pressure chambers 107 are arranged more densely, boundary walls therebetween may deform by means of a pressure in an adjacent pressure chamber 107, that is, "cross-talk" may occur. Therefore, in the case, it is difficult to densely arrange the nozzles.

In a case of forming a flowing-path plate 104 by pealing off an electrocasting layer formed on a jig substrate, a "warp" of the electrocasting layer may tend to occur during the peeling off from the jig substrate. That is, dimension accuracy of the flowing-path plate 104 may tend to be lower. In addition, the case needs a step of forming the electrocasting layer on the jig substrate and a step of peeling off the electrocasting layer from the jig substrate, which may result in longer time and greater cost.

SUMMARY OF THE INVENTION

The object of this invention is to solve the above problems, that is, to provide a liquid jetting head such as an ink-jet recording head wherein a "warp" of a flowing-path plate is prevented so that the liquid jetting head can be advantageously made more accurate, enlarged and made denser.

In order to achieve the object, a liquid jetting head includes: a flowing-path plate through which a flowing-path space is formed as a flowing-path for a liquid; a nozzle plate provided on one side surface of the flowing-path plate, said nozzle plate having a nozzle that is communicated with the flowing-path space; and a sealing plate provided on the other side surface of the flowing-path plate for sealing the flowing-path space; wherein a portion of the other side of the flowing-path space forms a pressure-chamber space; a portion of the other side of the flowing-path plate including at least a portion of the pressure-chamber space is formed by electrocasting; and a pressure-generating unit is provided at a portion of the other side of the sealing plate corresponding to the pressure-chamber space for changing a pressure of the liquid in the pressure chamber space.

According to the feature, since the portion of the other side of the flowing-path plate is formed by electrocasting, a "warp" of the flowing-path plate may be prevented. Thus, the flowing-path plate may be formed more accurately. In addition, since the portion formed by electrocasting, includes at least the portion of the pressure-chamber space, preferably the whole pressure-chamber space, boundary walls defining the pressure-chamber space may have a relatively higher rigidity. Thus, the pressure-chamber spaces may be arranged more densely. Therefore, the liquid jetting head is advantageous in being made denser, made more accurate, and enlarged.

In addition, since the pressure-chamber space is formed as the portion of the flowing-path space, the pressure-chamber space may be easily positioned relative to the nozzle. Thus, it may be prevented that an air bubble is generated and stays in the flowing-path space. In addition, a step of peeling off the electrocasting portion is unnecessary, which is advantageous in cost.

Preferably, the flowing-path plate has a substrate layer and an electrocasting layer formed on the other side surface of the substrate layer by electrocasting. In the case, the liquid jetting head may be easily produced.

For example, preferably, the pressure-chamber space is formed in the electrocasting layer as a through hole having substantially the same shape in a depth direction thereof, the one side surface of the pressure-chamber space is defined by the substrate layer, the other side surface of the pressure-chamber space is defined by the sealing plate, and lateral side surfaces of the pressure-chamber space are defined by the electrocasting layer. In the case, a communicating hole may be formed in the substrate layer for connecting the pressure-chamber space and the nozzle. The substrate layer and the nozzle plate maybe formed integratedly.

Alternatively, the flowing-path plate may have a substrate layer, an electrocasting layer formed on the other side surface of the substrate layer by electrocasting and a second electrocasting layer formed on the one side surface of the substrate layer by electrocasting. In the case, the liquid jetting head may be easily produced as well.

For example, preferably, the pressure-chamber space is formed in the electrocasting layer as a through hole having substantially a same shape in a depth direction thereof, the one side surface of the pressure-chamber space is defined by the substrate layer, the other side surface of the pressure-chamber space is defined by the sealing plate, lateral side surfaces of the pressure-chamber space are defined by the electrocasting layer, a second pressure-chamber space is formed in the second electrocasting layer as a through hole having substantially a same shape in a depth direction thereof, the second pressure-chamber space is communicated with the nozzle, the one side surface of the second pressure-chamber space is defined by the nozzle plate, the other side surface of the second pressure-chamber space is defined by the substrate layer, and lateral side surfaces of the second pressure-chamber space are defined by the second electrocasting layer. In the case, a communicating hole may be formed in the substrate layer for connecting the pressure-chamber space and the second pressure-chamber space.

According to the above feature, that is, when the pressure-chamber spaces are formed on both side surfaces of the substrate layer, a thickness of the electrocasting layer and a thickness the second electrocasting layer may be allowed to be thinner. Thus, the electrocasting step may be shortened. In addition, a warp of the electrocasting layer and a warp of the second electrocasting layer may be prevented more extremely.

In addition, preferably, a thermal expansion coefficient of the electrocasting layer and/or a thermal expansion coefficient of the second electrocasting layer are substantially equal to a thermal expansion coefficient of the substrate layer. In the case, a warp of the electrocasting layer and/or a warp of the second electrocasting layer may be prevented more extremely. More preferably, the electrocasting layer and/or the second electrocasting layer are made of nickel or chromium, which is superior in adherence to the substrate layer, rigidity, corrosion resistance or the like. In general, the substrate layer may be made of an electric conductive material.

In addition, preferably, a thickness of the electrocasting layer and/or a thickness of the second electrocasting layer are smaller than a thickness of the substrate layer. In the case, a warp of the electrocasting layer and/or a warp of the second electrocasting layer may be prevented more extremely.

In addition, a liquid reservoir space communicating with the pressure-chamber space may be also formed in the electrocasting layer. In the case, space may be utilized more efficiently. For example, preferably, the liquid reservoir space is formed in the electrocasting layer as a through hole having substantially the same shape in a depth direction thereof, the one side surface of the liquid reservoir space is defined by the substrate layer, the other side surface of the liquid reservoir space is defined by the sealing plate, and lateral side surfaces of the liquid reservoir space are defined by the electrocasting layer.

Similarly, a second liquid reservoir space communicating with the second pressure-chamber space may be also formed in the second electrocasting layer. For example, preferably, the second liquid reservoir space is formed in the second electrocasting layer as a through hole having substantially the same shape in a depth direction thereof, the one side surface of the second liquid reservoir space is defined by the nozzle plate, the other side surface of the second liquid reservoir space is defined by the substrate layer, and lateral side surfaces of the second liquid reservoir space are defined by the second electrocasting layer.

In addition, preferably, the nozzle plate is formed on the one side surface of the flowing-path plate by electrocasting. In the case, the number of parts and the number of steps for manufacturing the liquid jetting head may be reduced. Thus, the accuracy of the liquid jetting head may be improved mores and the cost thereof may be reduced more.

For example, the pressure-generating unit may have a piezoelectric vibrating member that can extend and contract. Alternatively, the pressure-generating unit may have a piezoelectric vibrating member that can bend. In these cases, the sealing plate is a vibrating plate that can deform and vibrate. Alternatively, the pressure-generating unit may have a heater that can heat the liquid in the pressure-chamber space. In the case, the sealing plate has a thermal conductivity.

In addition, this invention is a method of producing a liquid jetting head including: a flowing-path plate through which a flowing-path space is formed as a flowing-path for a liquid; a nozzle plate provided on one side surface of the flowing-path plate, said nozzle plate having a nozzle that is communicated with the flowing-path space; and a sealing plate provided on the other side surface of the flowing-path plate for sealing the flowing-path space; wherein a portion of the other side of the flowing-path space forms a pressure-chamber space; a portion of the other side of the flowing-path plate including at least a portion of the pressure-chamber space is formed by electrocasting; a pressure-generating unit is provided at a portion of the other side of the sealing plate corresponding to the pressure-chamber space for changing a pressure of the liquid in the pressure-chamber space; and the flowing-path plate has a substrate layer and an electrocasting layer formed on the other side surface of the substrate layer by electrocasting; having a pattern-forming step of forming and sticking a pattern corresponding to a portion of the flowing-path space in the portion of the other side of the flowing-path plate onto the other side surface, of the substrate layer, an electrocasting step of forming the portion of the other side of the flowing-path plate onto the other side surface of the substrate layer by electrocasting in such a manner that the pattern is covered, and a pattern-removing step of removing the pattern in order to form the portion of the flowing-path space in the portion of the other side of the flowing-path plate.

According to the feature, the liquid jetting head may be produced more accurately by means of the relatively simpler and easier steps.

For example, the pattern-forming step may include: a step of applying a photosensitive resin to the other side surface of the substrate layer; and a step of exposing and developing the applied photosensitive resin according to said pattern. In the case, the pattern may be formed more easily.

If an electrocasting speed is raised in order to increase productivity, a thickness of the portion formed by electrocasting may tend to be uneven. In the case, preferably, the method may further include a grinding step of grinding the other side surface of the flowing-path plate, after the pattern-removing step.

A communicating hole may be formed in the substrate layer for connecting the pressure-chamber space and the nozzle, before the pattern-forming step or after the pattern-removing step.

In addition, this invention is a method of producing a liquid jetting head including: a flowing-path plate through which a flowing-path space is formed as a flowing-path for a liquid; a nozzle plate provided on one side surface of the flowing-path plate, said nozzle plate having a nozzle that is communicated with the flowing-path space; and a sealing plate provided on the other side surface of the flowing-path plate for sealing the flowing-path space; wherein: a portion of the other side of the flowing-path space forms a pressure-chamber space; a portion of the other side of the flowing-path plate including at least a portion of the pressure-chamber space is formed by electrocasting; a pressure-generating unit is provided at a port ion of the other side of the sealing plate corresponding to the pressure-chamber space for changing a pressure of the liquid in the pressure chamber space; the flowing-path plate has a substrate layer, an electrocasting layer formed on the other side surface of the substrate layer by electrocasting and a second electrocasting layer formed on the one side surface of the substrate layer by electrocasting; the pressure-chamber space is formed in the electrocasting layer as a through hole having substantially a same shape in a depth direction thereof; the one side surface of the pressure-chamber space is defined by the substrate layer; the other side surface of the pressure-chamber space is defined by the sealing plate; lateral side surfaces of the pressure-chamber space are defined by the electrocasting layer; a second pressure-chamber space is formed in the second electrocasting layer as a through hole having substantially a same shape in a depth direction thereof; the second pressure-chamber space is communicated with the nozzle; the one side surface of the second pressure-chamber space is defined by the nozzle plate; the other side surface of the second pressure-chamber space is defined by the substrate layer; lateral side surfaces of the second pressure-chamber space are defined by the second electrocasting layer; and a communicating hole is formed in the substrate layer for connecting the pressure-chamber space and the second pressure-chamber space; including a pattern-forming step of forming and sticking a pattern corresponding to the pressure-chamber space onto the other side surface of the substrate layer, a second pattern-forming step of forming and sticking a second pattern corresponding to the second pressure-chamber space onto the one side surface of the substrate layer, an electrocasting step of forming the electrocasting layer onto the other side surface of the substrate layer by electrocasting in such a manner that the pattern is covered, an second electrocasting step of forming the second electrocasting layer onto the one side surface of the substrate layer by electrocasting in such a manner that the second pattern is covered, a pattern-removing step of removing the pattern in order to form the pressure-chamber space, and a second pattern-removing step of removing the second pattern in order to form the second pressure-chamber space.

According to the feature, the pressure-chamber spaces may be formed more accurately on both side surfaces of the substrate layer by means of the relatively simpler and easier steps.

In particular, if the pattern-forming step and the second pattern-forming step are conducted at substantially the same time and/or if the pattern-removing step and the second pattern-removing step are conducted at substantially the same time, a time for the steps may be shortened more.

In addition, the liquid reservoir space and/or the second liquid reservoir space may be formed by electrocasting, similarly to the flowing-path space. However, it is unnecessary for the liquid reservoir spaces to be formed accurately. Thus, the liquid reservoir spaces may be formed after the pattern-removing step or after the grinding step.

In addition, this invention is a method of producing a liquid jetting head including: a flowing-path plate through which a flowing-path space is formed as a flowing-path for a liquid; a nozzle plate provided on one side surface of the flowing-path plate, said nozzle plate having a nozzle that is communicated with the flowing-path space; and a sealing plate provided on the other side surface of the flowing-path plate for sealing the flowing-path space; wherein a portion of the other side of the flowing-path space forms a pressure-chamber space; a portion of the other side of the flowing-path plate including at least a portion of the pressure-chamber space is formed by electrocasting; a pressure-generating unit is provided at a portion of the other side of the sealing plate corresponding to the pressure-chamber space for changing a pressure of the liquid in the pressure-chamber space; and the nozzle plate is formed on the one side surface of the flowing-path plate by electrocasting; comprising; a pattern-forming step of forming and sticking a pattern corresponding to the nozzle of the nozzle plate onto the one side surface of the flowing-path plate, an electrocasting step of forming the nozzle plate, onto the one side surface of the flowing-path plate by electrocasting in such a manner that the pattern is covered, and a pattern-removing step of removing the pattern in order to form the nozzle.

According to the feature, the nozzle plate may be formed by electrocasting by means of the relatively simpler and easier steps.

For example, the pattern-forming step may include: a step of applying a photosensitive resin to the one side surface of the flowing-path plate; and a step of exposing and developing the applied photosensitive resin according to said pattern. In the case, the pattern may be formed more easily.

The method may further comprise a step of forming a communicating hole to the nozzle in the flowing-path plate, before the pattern-forming step. In the case, preferably, the pattern-forming step is a step of forming and sticking a first pattern to seal the communicating hole and a second pattern corresponding to the nozzle of the nozzle plate.

DETAILED DESCRIPTION

Embodiments of the invention will now be described in more detail with reference to drawings.

Figure 1A:
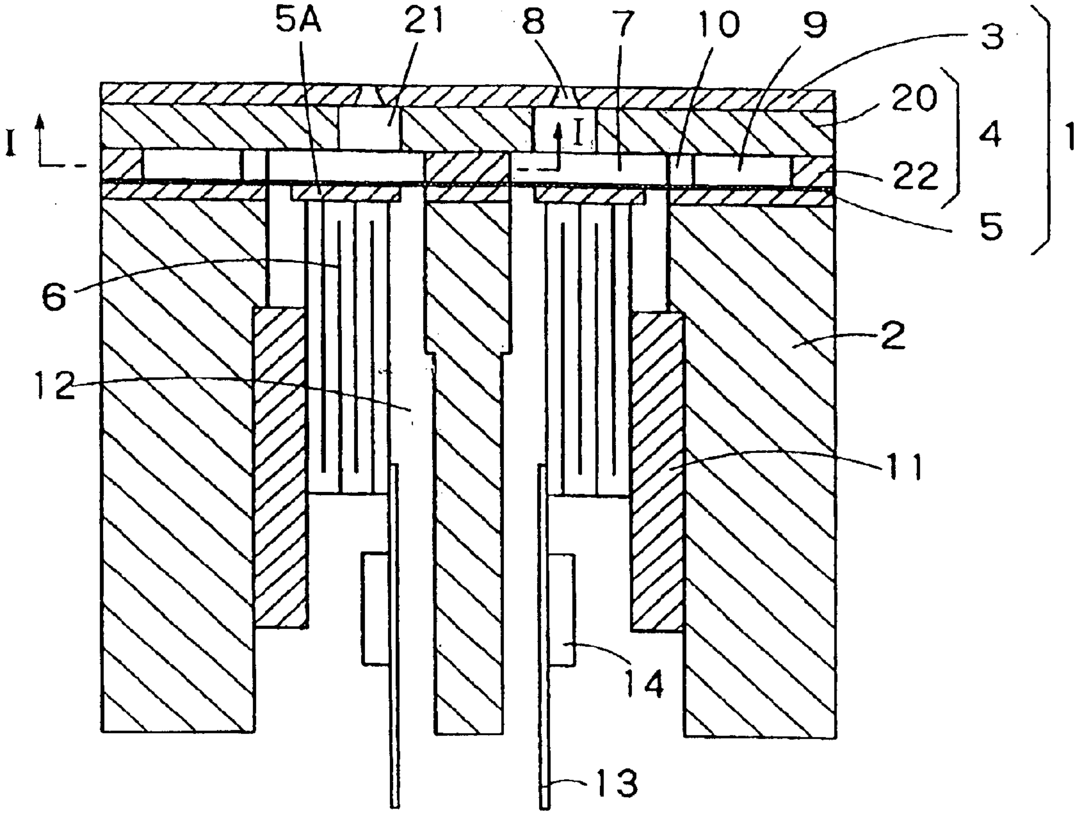
FIG. 1A is a schematic longitudinal sectional view of an ink-jetting recording head of a first embodiment according to the invention.
Figure 1B:
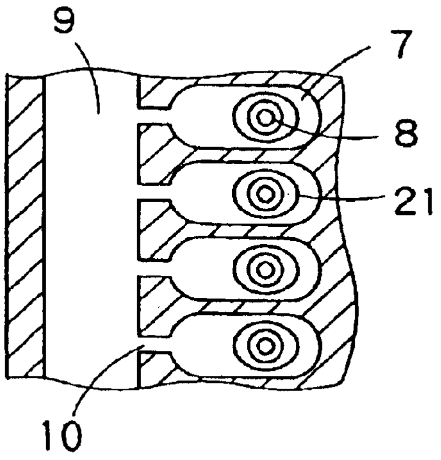
FIG. 1B is a schematic sectional view taken along A—A line of FIG. 1A.

FIGS. 1A and 1B show a first embodiment of an ink-jetting recording head (an example of liquid jetting head) according to the invention. The ink-jetting recording head includes longitudinal-vibration type of piezoelectric vibrating members. As shown in FIGS. 1A and 1B, the ink-jetting recording head has a flowing-path unit 1 provided with a lot of nozzles 8 and a lot of pressure chambers 7. The flowing-path unit 1 is stuck onto a head case 2 containing the piezoelectric vibrating members 6.

In detail, the flowing unit 1 consists of a nozzle plate 3 through which the nozzles 8 are formed in two rows, a flowing-path plate 4 through which the pressure-chamber spaces 7 respectively communicating with the nozzles 8 are formed and a vibrating plate 5 that seals lower openings of the pressure chambers 7. The nozzle plate 3, the flowing-path plate 4 and the vibrating plate 5 are layered one on top of another as shown in FIG. 1A. The nozzle plate 3 is made of stainless steel.

The flowing-path plate 4 has a substrate 20 (substrate layer) through which communicating holes 21 respectively communicating with the nozzles 8 are formed. A flowing-path portion 22 (electrocasting layer) is integratedly formed below the substrate 20 by electrocasting. The pressure chambers 7 are formed in the flowing-path portion 22. In the flowing-path portion 22, ink reservoir spaces 9 are formed for storing ink that is introduced into the respective pressure chambers 7. In addition, ink-paths 10 are formed in the flowing-path portion 22 for connecting the respective pressure chambers 7 and the ink reservoir spaces 9.

The substrate 20 may be made of any material having certain rigidity and certain electric conductivity. For example, the substrate 20 may be made of stainless steel, nickel, aluminum, titanium, copper, zinc, or any other metal.

Among these materials, stainless steel and nickel are preferably used because they are superior in corrosion resistance and easy to be machined.

In addition, the flowing-path portion 22 may be made of any material capable of electrocasting onto the substrate 20. For example, the flowing-path portion 22 may be made of silver, gold, copper, chromium, iron, nickel, zinc, or any other pure metal, copper-nickel, copper-tin, copper-zinc, iron-nickel, or any other compound metal. Among these materials, chromium and nickel are preferably used because they are superior in adherence to the substrate 20, rigidity, corrosion resistance or the like.

In general, the material of the substrate 20 is different from the material of the flowing-path portion 22. However, the material of the substrate 20 may be the same as the material of the flowing-path portion 22.

The head case 2 is made of a synthetic resin. The head case 2 has vertical through spaces 12. The piezoelectric vibrating members 6 are contained in the spaces 12. Tail ends of the piezoelectric vibrating members 6 are fixed to a fixing plate 11, which is attached to the head case 2. Leading surfaces of the piezoelectric vibrating members 6 are fixed to island portions 5A of the vibrating plate 5, respectively.

When a driving signal generated in a driving circuit 14 is inputted to a piezoelectric vibrating member 6 through a flexible circuit board 13, the piezoelectric vibrating member 6 extends and contracts in a longitudinal direction thereof. When the piezoelectric vibrating member 6 extends and contracts, the corresponding island portion 5A of the vibrating plate 5 vibrates to change a pressure of the ink in the corresponding pressure chamber 7. Thus, the ink in the pressure chamber 7 may be jetted from the corresponding nozzle 8 as a drop of the ink.

As described above, in the above recording head, the flowing-path portion 22 formed by electrocasting and the substrate 20 are integratedly formed. Thus, a "warp" of the flowing-path portion 22 may be prevented, so that the flowing-path unit 1 can be formed more accurately. In addition, if linear expansion coefficients of the plates that form the flowing-path unit 1 are substantially the same as each other, a "warp" of the flowing-path portion 22 may be prevented so further extremely that enlargement of the flowing-path unit 1 may be enabled. In addition, boundary walls between adjacent pressure chambers 7 can be made of metal and have such a high rigidity that the pressure chambers 7 can be arranged more densely. In addition, since the substrate 20 and the flowing-path portion 22 are integratedly formed, the nozzle 8 and the communication hole 21 are positioned more accurately with respect to each other. Thus, it may be prevented that an air bubble is generated and stays. In addition, since the substrate 20 and the flowing-path portion 22 are integratedly formed, that is, since a step of peeling off the electrocasting portion is unnecessary, there is an advantage in cost.

Figure 2:
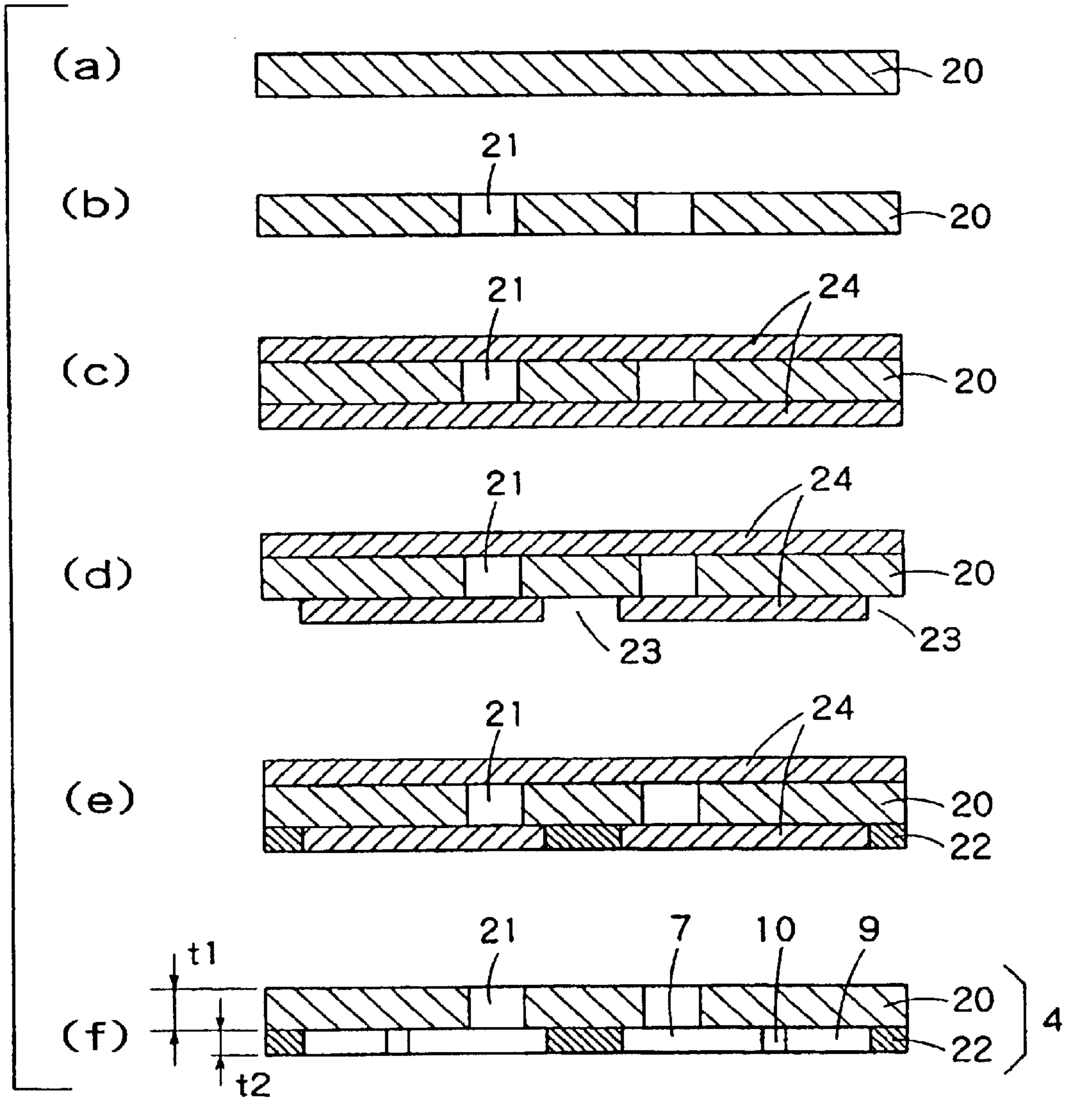
FIG. 2 is a view for explaining steps of a first example of a method for producing an ink-jetting recording head according to the invention.

FIG. 2 is a view for explaining a first example of a method for producing the ink-jetting recording head shown in FIGS. 1A and 1B. At first, as shown in FIG. 2(*a*), a substrate 20 is prepared.

Then, as shown in FIG. 2(*b*), communication holes 21 are formed through the substrate 20 by means of a pressing process, a dry-etching process, a laser-machining process or the like.

Next, as shown in FIG. 2(*c*), a photosensitive resin 24 is applied onto both side surfaces of the substrate 20. Then, as shown in FIG. 2(*d*), the photosensitive resin is exposed and developed together with a conventional patterning (masking) tool, so that only a patterned portion 23 of a lower surface of the substrate 20 is exposed. The patterned portion 23 corresponds to walls of a flowing-path portion 22. Except for the patterned portion 23, the both side surfaces of the substrate 20 are masked.

Herein, the photosensitive resin 24 may be any type of photosensitive resin capable of resisting immersion into an electrocasting bath. For example, the photosensitive resin 24 is preferably a dry-film photo-resist, which can achieve evenness of resin thickness and/or a relatively thicker resin mask.

Next, the substrate 20 is immersed in the electrocasting bath. Then, a direct-current voltage is applied to the electrocasting bath while using the substrate 20 as a cathode. Thus, as shown in FIG. 2(*e*), nickel or chromium is accumulated on the patterned portion 23 by electrocasting. Thus, the flowing-path portion 22 is foamed. Herein, the electrocasting bath may be any type of electrocasting bath. For example, for nickel-electrocasting, the electrocasting bath may be a nickel-nitrate bath added ammonium chloride and boric acid. For chromium-electrocasting, the electrocasting bath may be a bath consisting of anhydrous chromium acid and sulfuric acid.

Then, as shown in FIG. 2(*f*), the photosensitive resin 24 is completely removed. Then, the surface of the flowing-path portion 22 is ground so that a thickness t2 of the flowing-path portion 22 is adjusted to a predetermined uniform thickness. Thus, the flowing-path plate 4 is completed. After that, a nozzle plate 3 and a vibrating plate 5 are respectively layered onto the both side surfaces of the flowing-path plate 4, in order to form a flowing-path unit 1 (see FIGS. 1A and 1B).

At that time, the thickness t2 of the flowing-path portion 22 formed on the substrate 20 is preferably set to be smaller than a thickness, t1 of the substrate 20. In the case, the electrocasting may tend not to cause the warp, so that the, flowing-path unit 1 may be formed more accurately.

As described above, in the above recording head, the flowing-path portion 22 is formed on the substrate 20 by electrocasting. Thus, the warp of the flowing-path portion 22 may be prevented, so that the flowing-path unit 1 can be formed more accurately. In addition, since the substrate 20 and the flowing-path portion 22 are integratedly formed, that is, since a step of peeling off the electrocasting portion is not included, there is an advantage in cost. In addition, since the surface of the flowing-path portion 22 is ground after removing the photosensitive resin 24, unevenness of the thickness t2 of the flowing-path portion 22, which may be caused by the electrocasting step, may be removed. That is, the thickness may be adjusted more accurately. In particular, if an electrocasting speed is raised in order to increase productivity, unevenness of the thickness t2 may be easily caused during the electrocasting step. In the case, it is very effective to grind the surface of the flowing-path portion 22.

Figure 3:
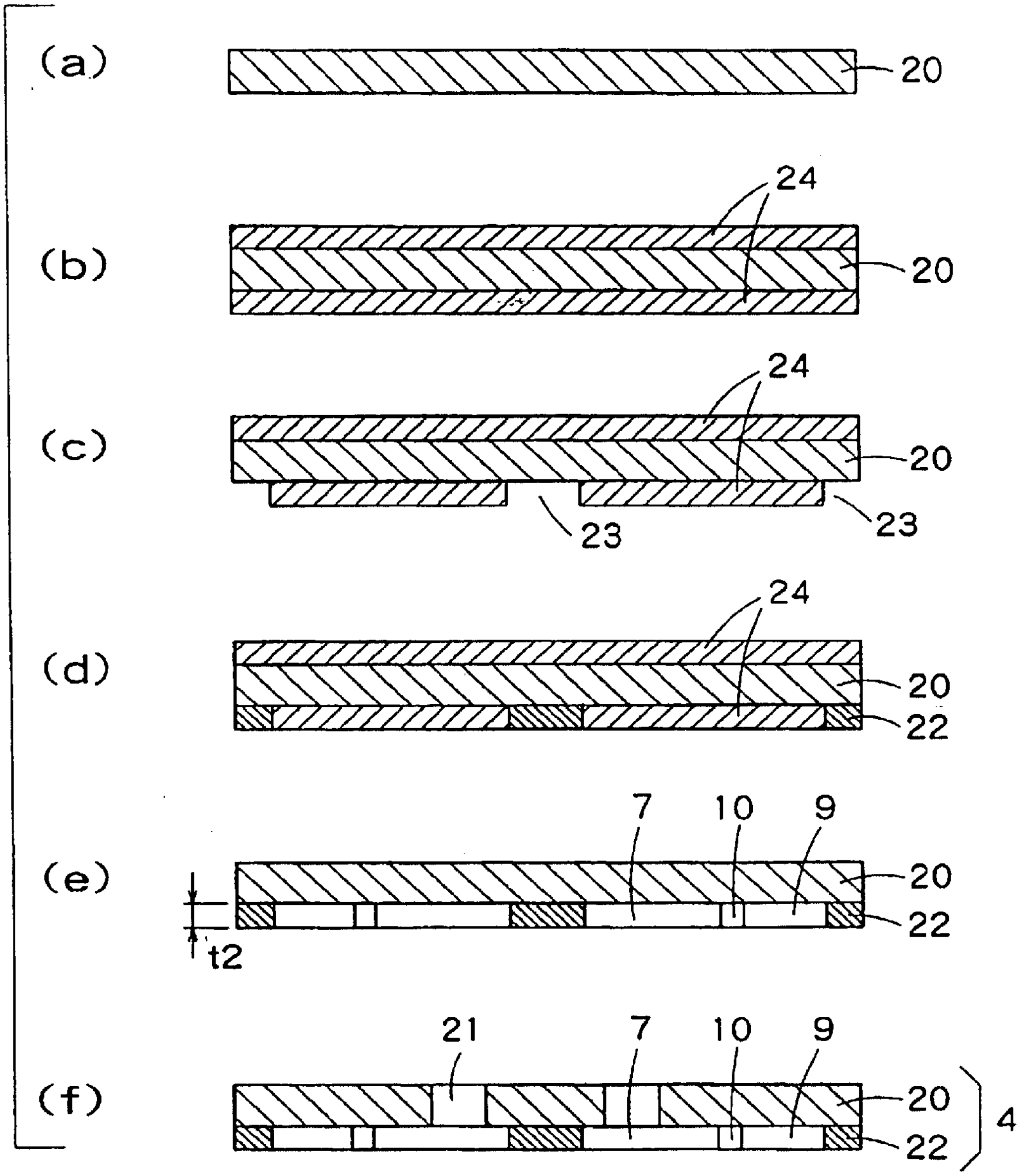
FIG. 3 is a view for explaining steps of a second example of a method for producing an ink-jetting recording head according to the invention.

FIG. 3 is a view for explaining a second example of a method for producing the ink-jetting recording head shown in FIGS. 1A and 1B. In the second example, at first, as shown in FIG. 3(*a*), a substrate 20 is prepared.

Next, as shown in FIG. 3(*b*), a photosensitive resin 24 is applied onto both side surfaces of the substrate 20. Then, as shown in FIG. 3(*c*), the photosensitive resin is exposed and developed together with a conventional patterning (masking) tool, so that only a patterned portion 23 of a lower surface of the substrate 20 is exposed. The patterned portion 23 corresponds to walls of a flowing-path portion 22. Except for the patterned portion 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 3(*d*), nickel or chromium is accumulated on the patterned portion 23 by electrocasting. Thus, the flowing-path portion 22 is formed.

Then, as shown in FIG. 3(*e*), the photosensitive resin 24 is completely removed. Then, the surface of the flowing-path portion 22 is ground so that a thickness t2 of the flowing-path portion 22 is adjusted to a predetermined uniform thickness.

Thus, the flowing-path plate 4 is completed.

After that, as shown in FIG. 3(*f*), communication holes 21 are formed through the substrate 20 by means of a pressing process, a dry-etching process; a laser machining process or the like.

Other steps are substantially the same as the first example described above. The second example can achieve substantially the same effect as the first example.

Figure 4A:
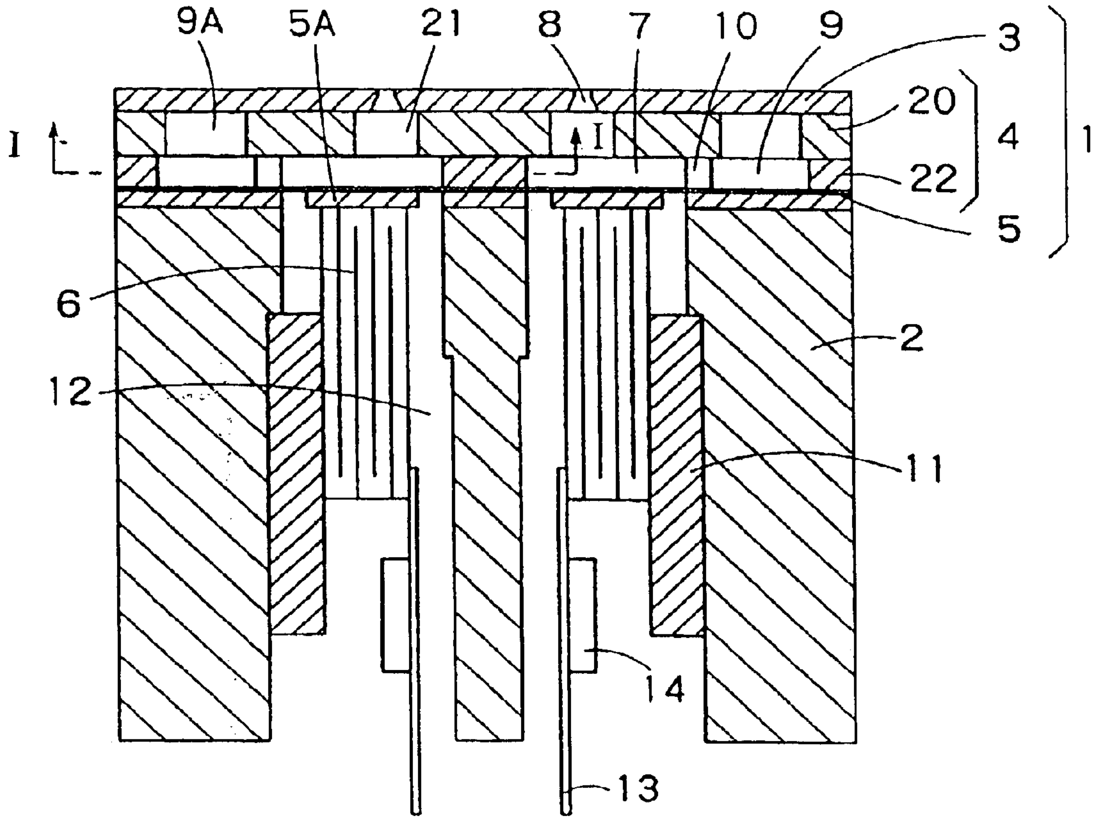
FIG. 4A is a schematic longitudinal sectional view of an ink-jetting recording head of a second embodiment according to the invention.
Figure 4B:
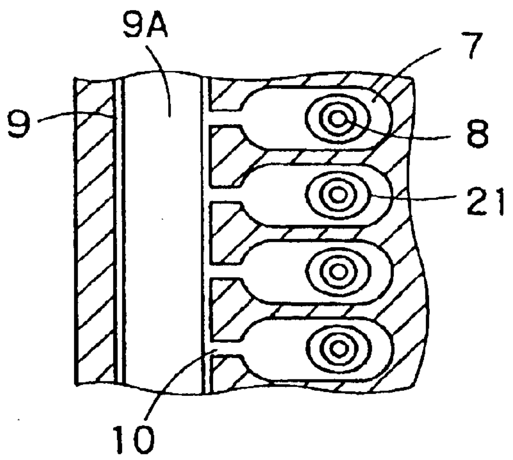
FIG. 4B is a schematic sectional view taken along A—A line of FIG. 4A.

FIGS. 4A and 4B show a second embodiment of an ink-jetting recording head according to the invention. In the ink-jetting recording head, opening portions 9A are formed through portions of the substrate 20 corresponding to the ink reservoir spaces 9, in order to communicate with the ink reservoir spaces 9 and substantially increase capacities thereof. Other structure is substantially the same as the first embodiment shown in FIG. 1. In the second embodiment, the same numeral references correspond to the same elements as the first embodiment. The explanation of the same elements is not repeated.

According to the second embodiment, in addition to the flowing-path portion 22, the substrate 20 has a space for storing the ink. Thus, the whole space of the flowing-path plate may be utilized more efficiently. Volumes of the ink reservoir spaces 9 and the opening portions 9A may be easily designed to be an enough size. In addition, the second embodiment can have substantially the same advantage as the first embodiment.

Figure 5:
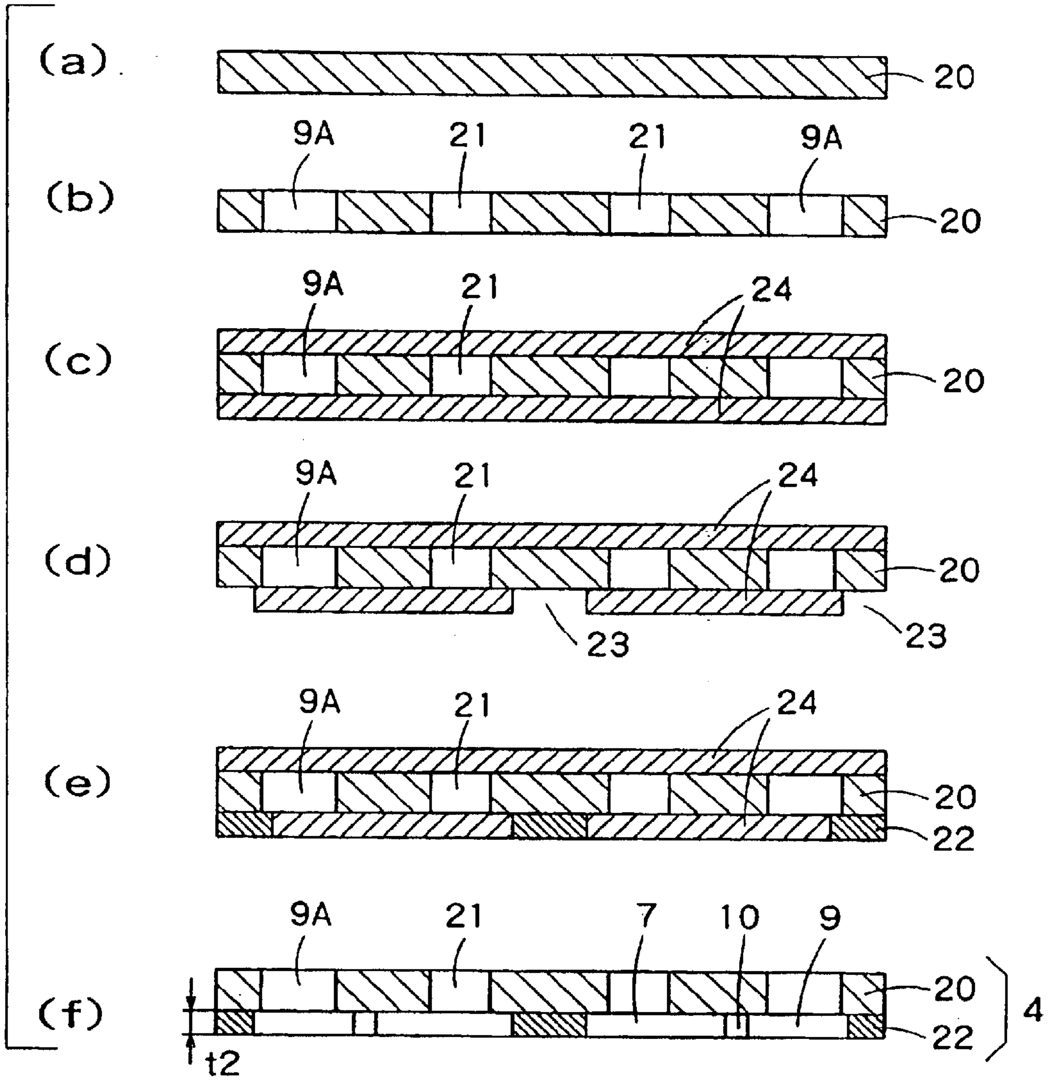
FIG. 5 is a view for explaining steps of a third example of a method for producing an ink-jetting recording head according to the invention.

FIG. 5 is a view for explaining a third example of a method for producing the ink-jetting recording head according to the invention. The third example is for producing the ink-jetting recording head shown in FIGS. 4A and 4B. At first, as shown in FIG. 5(*a*), a substrate 20 is prepared. Then, as shown in FIG. 5(*b*), communication holes 21 and opening portions 9A are formed through the substrate 20 by means of a pressing process, a dry-etching process, a laser-machining process or the like.

Next, as shown in FIG. 5(*c*), a photosensitive resin 24 is applied onto both side surfaces of the substrate 20. Then, as shown in FIG. 5(*d*), the photosensitive resin is exposed and developed together with a conventional patterning (masking) tool, so that only a patterned portion 23 of a lower surface of the substrate 20 is exposed. The patterned portion 23 corresponds to walls of a flowing-path portion 22. Except for the patterned portion 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 5(*e*), nickel or chromium is accumulated on the patterned portion 23 by electrocasting. Thus, the flowing-path portion 22 is formed.

Then, as shown in FIG. 5(*f*), the photosensitive resin 24 is completely removed. Then, the surface of the flowing-path portion 22 is ground so that a thickness t2 of the flowing-path portion 22 is adjusted to a predetermined uniform thickness. Thus, the flowing-path plate 4 is completed.

Other steps are substantially the same as the first example described above. The third example can achieve substantially the same effect as the first example.

Figure 6:
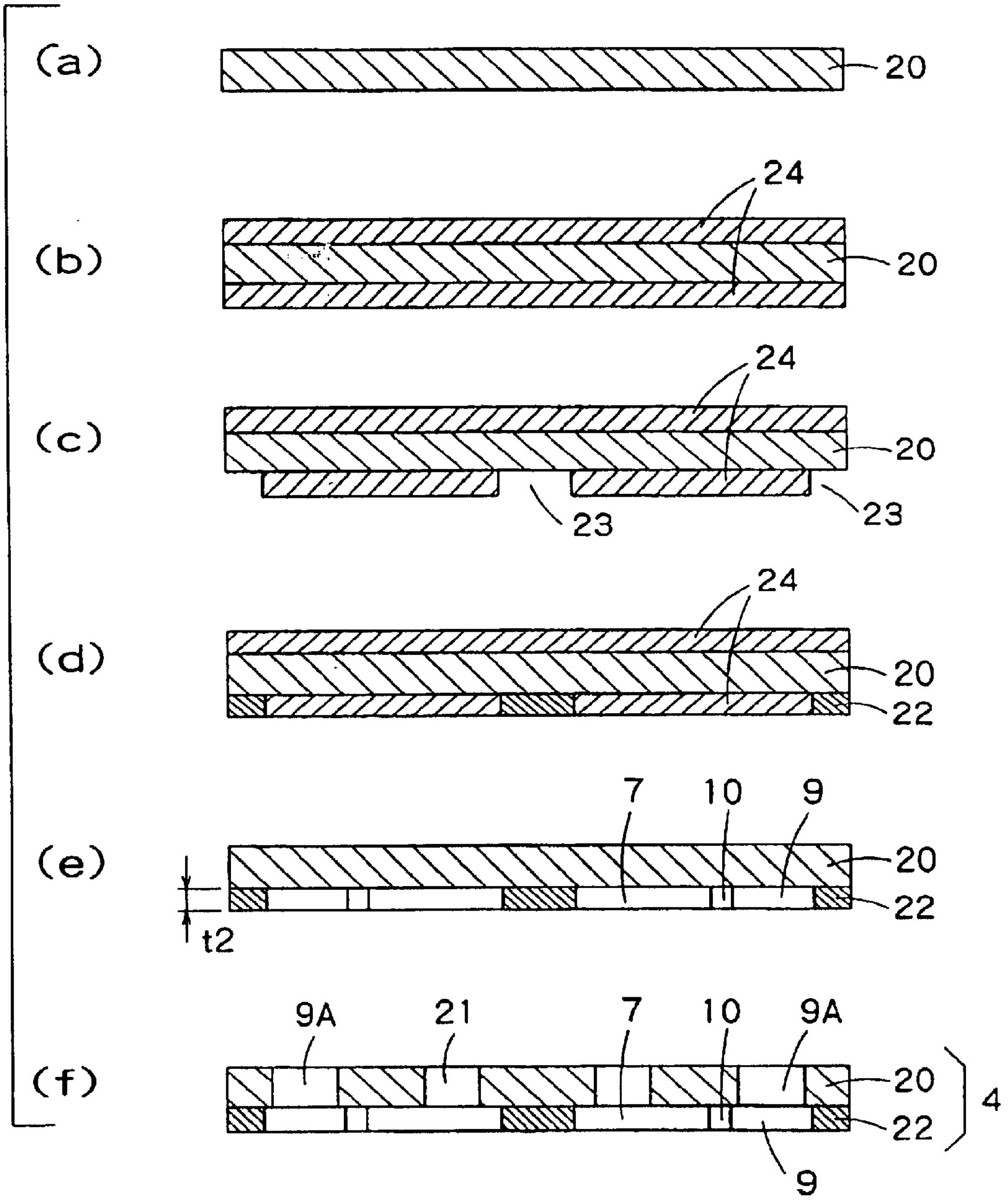
FIG. 6 is a view for explaining steps of a fourth example of a method for producing an ink-jetting recording head according to the invention.

FIG. 6 is a view for explaining a fourth example of a method for producing the ink-jetting recording head according to the invention. The fourth example is also for producing the ink-jetting recording head shown in FIGS. 4A and 4B. In the fourth-example, at first, as shown in FIG. 6(*a*), a substrate 20 is prepared.

Next, as shown in FIG. 6(*b*), a photosensitive resin 24 is applied onto both side surfaces of the substrate 20. Then, as shown in FIG. 6(*c*), the photosensitive resin is exposed and developed together with a conventional patterning (masking) tool, so that only a patterned portion 23 of a lower surface of the substrate 20 is exposed. The patterned portion 23 corresponds to walls of a flowing-path portion 22. Except for the patterned portion 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 6(*d*), nickel or chromium is accumulated on the patterned portion 23 by electrocasting. Thus, the flowing-path portion 22 is formed.

Then, as shown in FIG. 6(*e*), the photosensitive resin 24 is completely removed. Then, the surface of the flowing-path portion 22 is ground so that a thickness t2 of the flowing-path portion 22 is adjusted to a predetermined uniform thickness. Thus, the flowing-path plate 4 is completed.

After that, as shown in FIG. 6(*f*), communication holes 21 and opening portions 9A are formed through the substrate 20 by means of a pressing process, a dry-etching process, a laser-machining process or the like.

Other steps are substantially the same as the first example described above. The fourth example can achieve substantially the same effect as the first example.

Figure 7A:
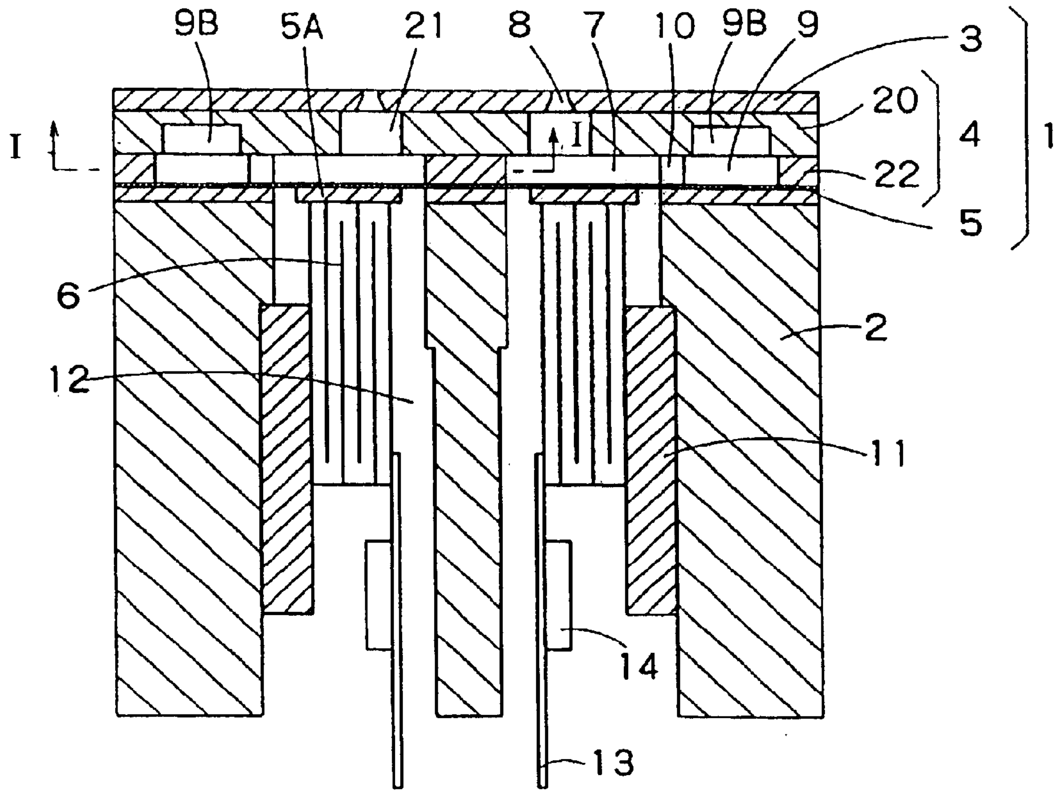
FIG. 7A is a schematic longitudinal sectional view of an ink-jetting recording head of a third embodiment according to the invention.
Figure 7B:
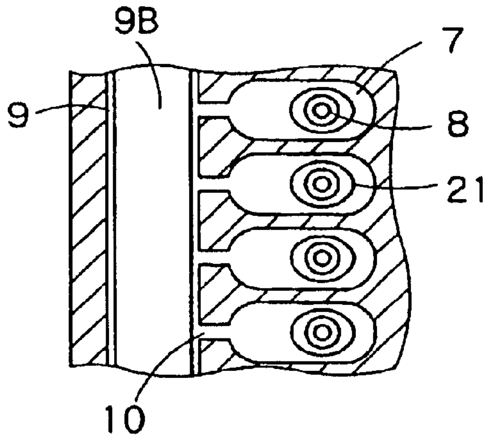
FIG. 7B is a schematic sectional view taken along A—A line of FIG. 7A.

FIGS. 7A and 7B show a third embodiment of an ink-jetting recording head according to the invention. In the ink-jetting recording head, recesses 9B are formed at portions of the substrate 20 corresponding to the ink reservoir spaces 9, in order to communicate with the ink reservoir spaces 9 and substantially increase capacities thereof. Other structure is substantially the same as the first embodiment shown in FIG. 1. In the third embodiment, the same numeral references correspond to the same elements as the first embodiment. The explanation of the same elements is not repeated.

According to the third embodiment, in addition to the flowing-path portion 22, the substrate 20 has a space for storing the ink. Thus, the whole space of the flowing-path plate may be utilized more efficiently. Volumes of the ink reservoir spaces 9 and the recesses 9B may be easily designed to be an enough size. In addition, the third embodiment can have substantially the same advantage as the first embodiment.

Figure 8:
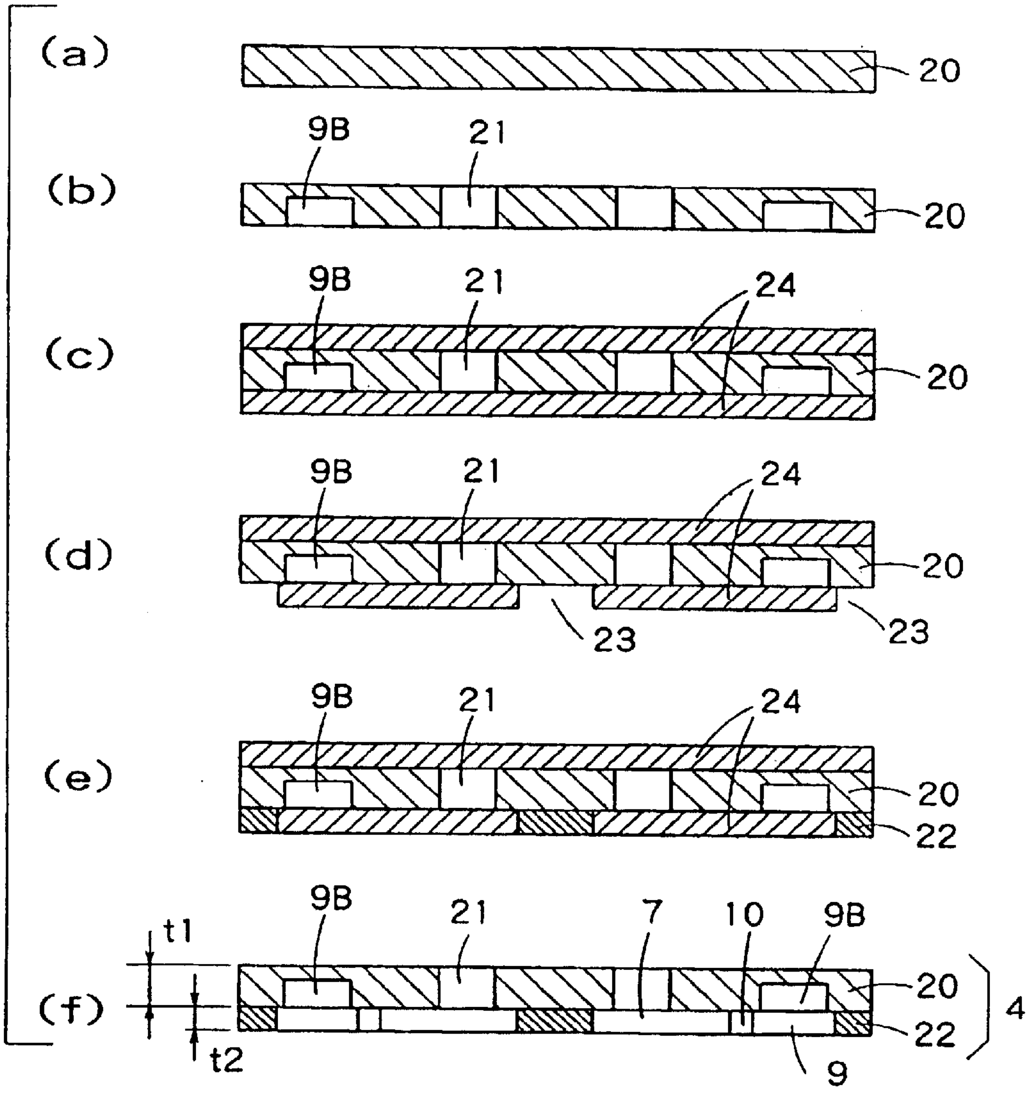
FIG. 8 is a view for explaining steps of a fifth example of a method for producing an ink-jetting recording head according to the invention.

FIG. 8 is a view for explaining a fifth example of a method for producing the ink-jetting recording head according to the invention. The fifth example is for producing the ink-jetting recording head shown in FIGS. 7A and 7B. At first, as shown in FIG. 8(*a*), a substrate 20 is prepared. Then, as shown in FIG. 8(*b*), communication holes 21 and recesses 9B are formed in the substrate 20 by means of a pressing process, a dry-etching process, a laser-machining process or the like.

Next, as shown in FIG. 8(*c*), a photosensitive resin 24 is applied onto both side surfaces of the substrate 20. Then, as shown in FIG. 8(*d*), the photosensitive resin is exposed and developed together with a conventional patterning (masking) tool, so that only a patterned portion 23 of a lower surface of the substrate 20 is exposed. The patterned portion 23 corresponds to walls of a flowing-path portion 22. Except for the patterned portion 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 8(*e*), nickel or chromium is accumulated on the patterned portion 23 by electrocasting. Thus, the flowing-path portion 22 is formed.

Then, as shown in FIG. 8(*f*), the photosensitive resin 24 is completely removed. Then, the surface of the flowing-path portion 22 is ground so that a thickness t2 of the flowing-path portion 22 is adjusted to a predetermined uniform thickness. Thus, the flowing-path plate 4 is completed.

Other steps are substantially the same as the first example described above. The fifth example can achieve substantially the same effect as the first example.

Figure 9:
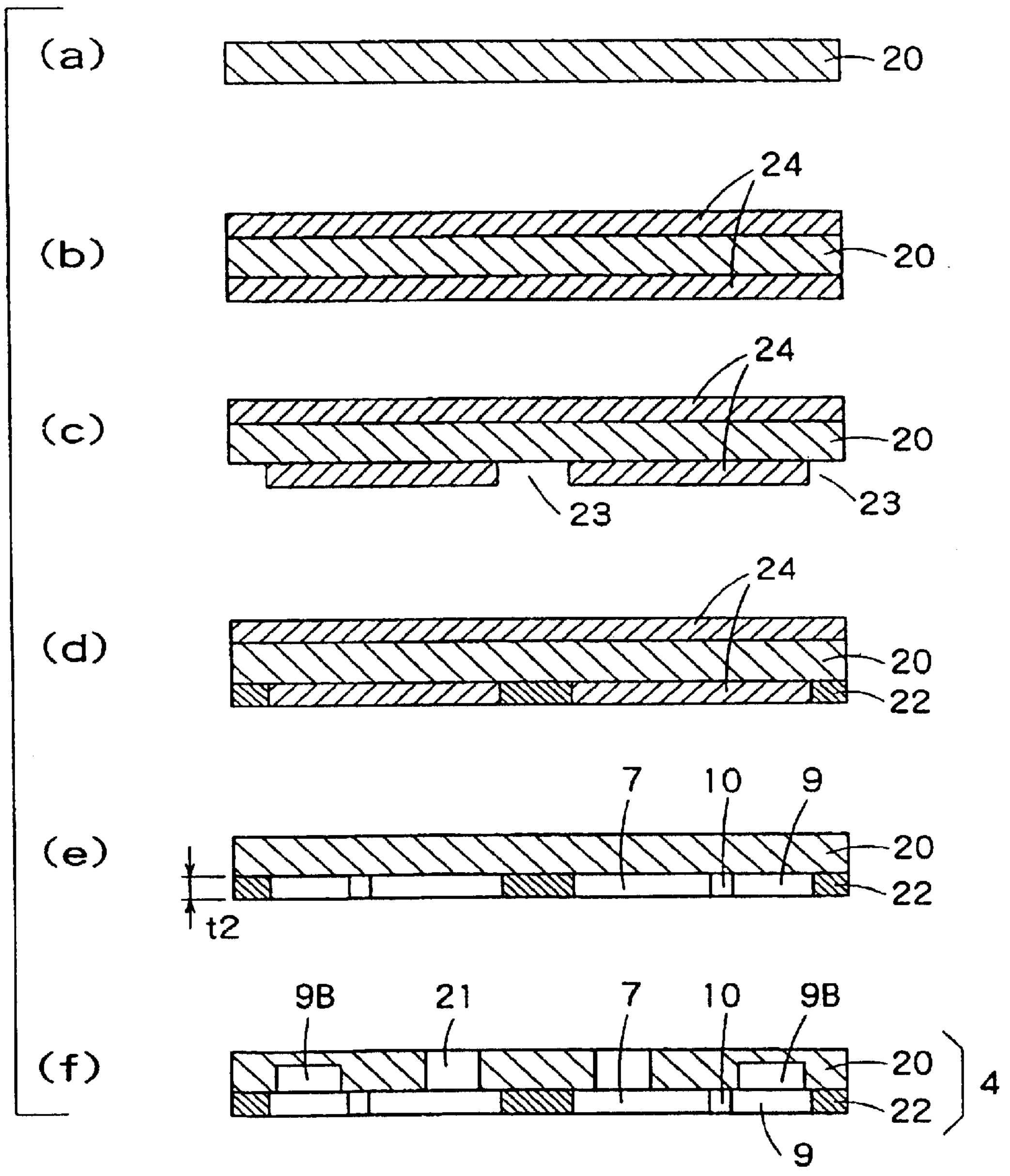
FIG. 9 is a view for explaining steps of a sixth example of a method for producing an ink-jetting recording head according to the invention.

FIG. 9 is a view for explaining a sixth example of a method for producing the ink-jetting recording head according to the invention. The sixth example is also for producing the ink-jetting recording head shown in FIGS. 7A and 7B. In the sixth example, at first, as shown in FIG. 9(*a*), a substrate 20 is prepared.

Next, as shown in FIG. 9(*b*), a photosensitive resin 24 is applied onto both side surfaces of the substrate 20. Then, as shown in FIG. 9(*c*), the photosensitive resin is exposed and developed together with a conventional patterning (masking) tool, so that only a patterned portion 23 of a lower surface of the substrate 20 is exposed. The patterned portion 23 corresponds to walls of a flowing-path portion 22. Except for the patterned portion 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 9(*d*), nickel or chromium is accumulated on the patterned portion 23 by electrocasting. Thus, the flowing-path portion 22 is formed.

Then, as shown in FIG. 9(*e*), the photosensitive resin 24 is completely removed. Then, the surface of the flowing-path portion 22 is ground so that a thickness t2 of the flowing-path portion 22 is adjusted to a predetermined uniform thickness. Thus, the flowing-path plate 4 is completed.

After that, as shown in FIG. 9(*f*), communication holes 21 and recesses 9B are formed in the substrate 20 by means of a pressing process, a dry-etching process, a laser-machining process or the like.

Other steps are substantially the same as the first example described above. The sixth example can achieve substantially the same effect as the first example.

Figure 10:
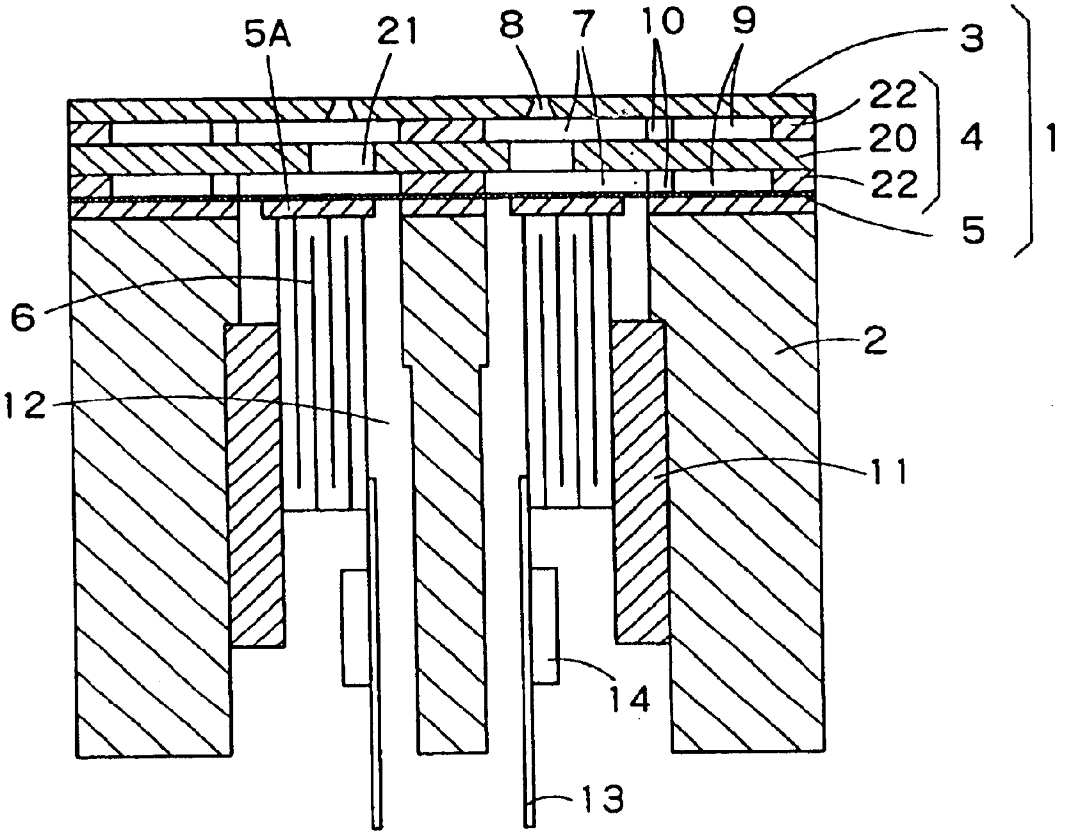
FIG. 10 is a schematic longitudinal sectional view of an ink-jetting recording head of a fourth embodiment according to the invention.

FIG. 10 shows a fourth embodiment of an ink-jetting recording head according to the invention. In the ink-jetting recording head, two flowing-path portions 22 are respectively formed onto the both side surfaces of the substrate 20 by electrocasting, as an electrocasting layer and a second electrocasting layer. Other structure is substantially the same as the first embodiment shown in FIG. 1. In the fourth embodiment, the same numeral references correspond to the same elements as the first embodiment. The explanation of the same elements is not repeated.

According to the fourth embodiment, since the flowing-path portions 22 are formed on the both side surfaces of the substrate 20, a thickness of each of the flowing-path portions 22 may be allowed to be thinner. Thus, the electrocasting step may be shortened. In addition, a warp of each of the flowing-path portions 22 may be prevented more extremely. In addition, the fourth embodiment can have substantially the same advantage as the first embodiment.

Figure 11:
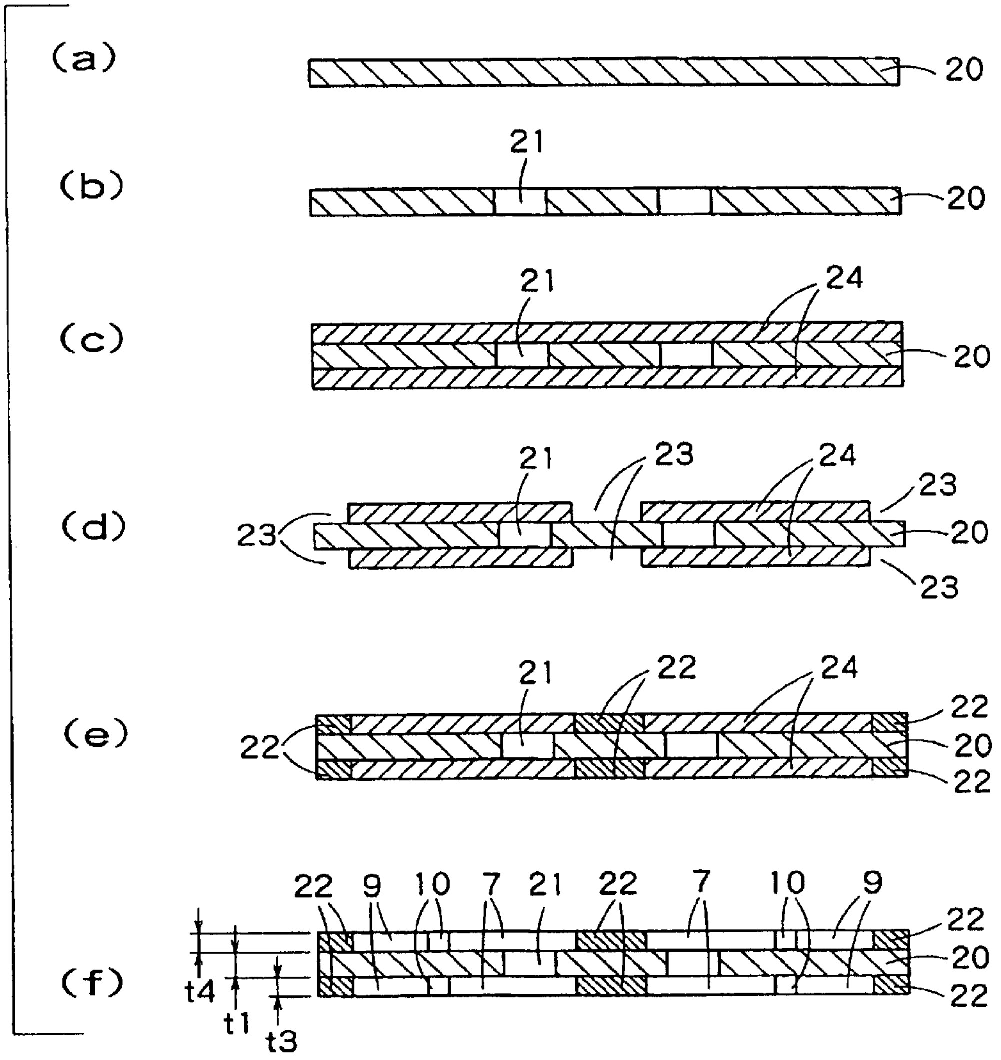
FIG. 11 is a view for explaining steps of a seventh example of a method for producing an ink-jetting recording head according to the invention.

FIG. 11 is a view for explaining a seventh example of a method for producing the ink-jetting recording head according to the invention. The seventh example is for producing the ink-jetting recording head shown in FIG. 10. At first, as shown in FIG. 11(*a*), a substrate 20 is prepared. Then, as shown in FIG. 11(*b*), communication holes 21 are formed through the substrate 20 by means of a pressing process, a dry-etching process, a laser-machining process or the like.

Next, as shown in FIG. 11(*c*), a photosensitive resin 24 is applied onto both side surfaces of the substrate 20. Then, as shown in FIG. 11(*d*), the photosensitive resin is exposed and developed together with a conventional patterning (masking) tool, so that only respective patterned portions 23 of the both side surfaces of the substrate 20 are exposed. The patterned portions 23 correspond to walls of the respective flowing-path portions 22. Except for the patterned portions 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 11(*e*), nickel or chromium is accumulated on the patterned portions 23 by electrocasting. Thus, the upper and lower flowing-path portions 22 are formed.

Then, as shown in FIG. 11(*f*), the photosensitive resin 24 is completely removed. Then, the respective surfaces of the flowing-path portions 22 are ground so that respective thicknesses t3 and t4 of the flowing-path portions 22 are adjusted to predetermined uniform thicknesses. Thus, the flowing-path plate 4 is completed.

Preferably, t3 is equal to t4 (t3=t4). In the case, remaining stresses in the respective flowing-path portions 22 may be evenly balanced after the electrocasting step. Thus, the warp of the flowing-path plate 4 may be prevented more extremely.

In the method shown in FIG. 11, the respective thicknesses t3 and t4 of the two flowing-path portions 22 may be allowed to be thinner than the case of only a single flowing-path portion 22. Thus, the electrocasting step may be shortened. In addition, preferably, the thicknesses t3 and t4 of the flowing-path portions 22 are respectively thinner than the thickness t1 of the substrate 20.

Other steps are substantially the same as the first example described above. The seventh example can achieve substantially the same effect as the first example.

Figure 12:
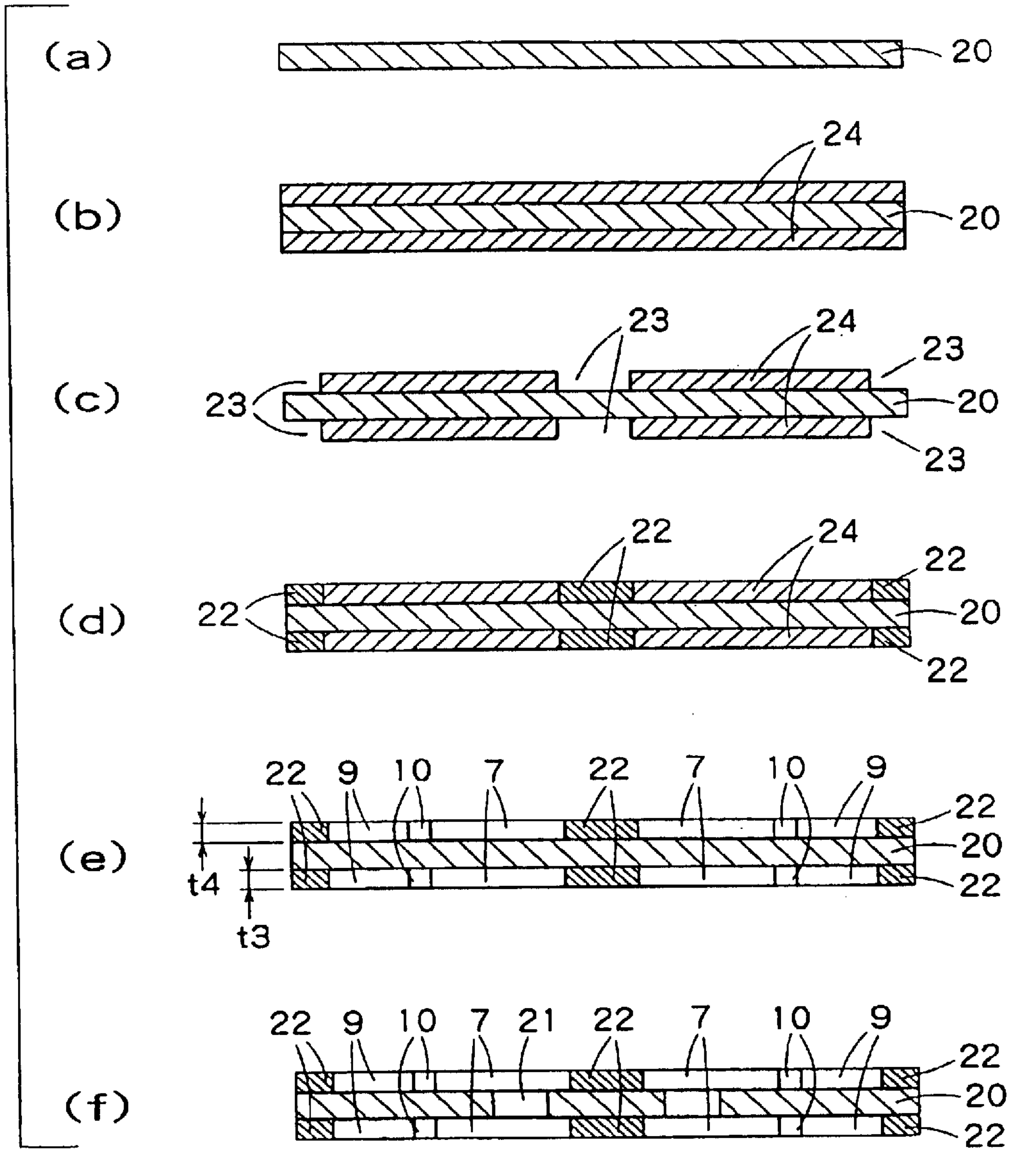
FIG. 12 is a view for explaining steps of a eighth example of a method for producing an ink-jetting recording head according to the invention.

FIG. 12 is a view for explaining an eighth example of a method for producing the ink-jetting recording head according to the invention. The eighth example is also for producing the ink-jetting recording head shown in FIG. 10. In the eighth example, at first, as shown in FIG. 12(*a*), a substrate 20 is prepared.

Next, as shown in FIG. 12(*b*), a photosensitive resin 24 is applied onto both side surfaces of the substrate 20. Then, as shown in FIG. 12(*c*), the photosensitive resin is exposed and developed together with a conventional patterning (masking) tool, so that only respective patterned portions 23 of the both side surfaces of the substrate 20 are exposed. The patterned portions 23 correspond to walls of respective flowing-path portions 22. Except for the patterned portions 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 12(*d*), nickel or chromium is accumulated on the patterned portions 23 by electrocasting. Thus, the upper and lower flowing-path portions 22 are foamed.

Then, as shown in FIG. 12(*e*), the photosensitive resin 24 is completely removed. Then, the respective surfaces of the flowing-path portions 22 are ground so that respective thicknesses t3 and t4 of the flowing-path portions 22 are adjusted to predetermined uniform thicknesses. Thus, the flowing-path plate 4 is completed.

After that, as shown in FIG. 12(*f*), communication holes 21 are formed through the substrate 20 by means of a pressing process, a dry-etching process, a laser-machining process or the like.

Other steps are substantially the same as the first example described above. The eighth example can achieve substantially the same effect as the first example.

Figure 13:
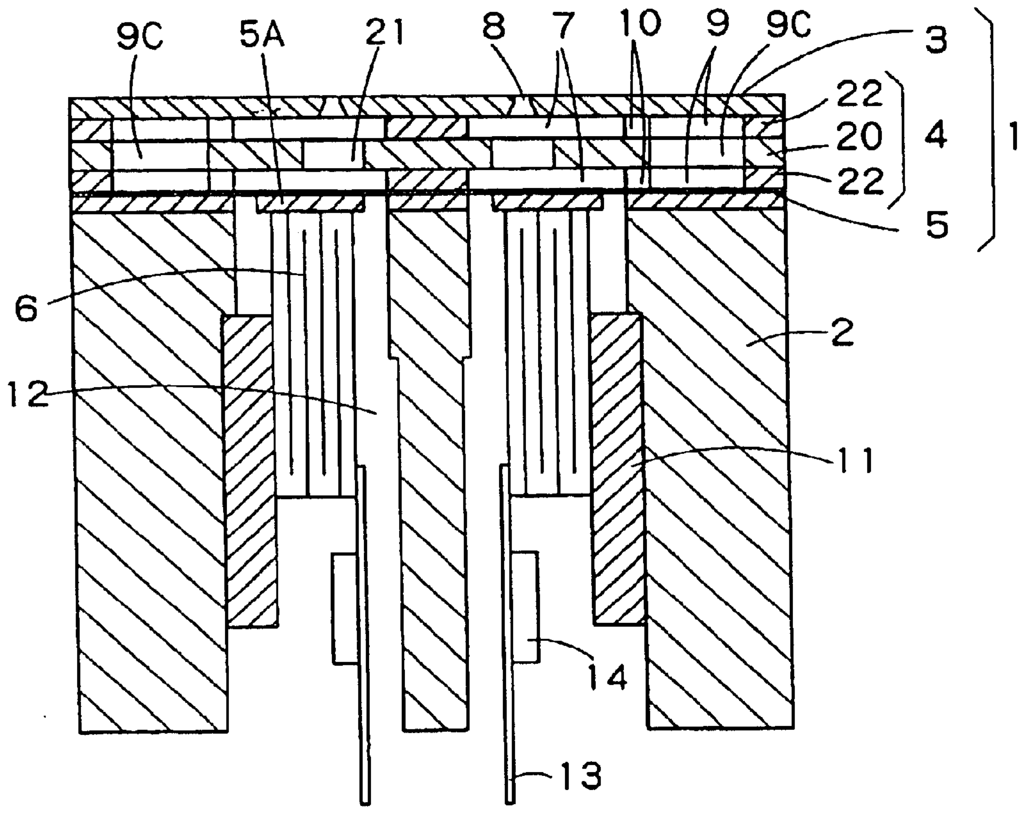
FIG. 13 is a schematic longitudinal sectional view of an ink-jetting recording head of a fifth embodiment according to the invention.

FIG. 13 shows a fifth embodiment of an ink-jetting recording head according to the invention. In the ink-jetting recording head, opening portions 9C are formed through portions of the substrate 20 corresponding to the ink reservoir spaces 9, in order to communicate with the ink reservoir spaces 9 and substantially increase capacities thereof. Other structure is substantially the same as the fourth embodiment shown in FIG. 10. In the fifth embodiment, the same numeral references correspond to the same elements as the fourth embodiment. The explanation of the same elements is not repeated.

According to the fifth embodiment, in addition to the flowing-path portions 22, the substrate 20 has a space for storing the ink. Thus, the whole space of the flowing-path plate may be utilized more efficiently. Volumes of the ink reservoir spaces 9 and the opening portions 9C may be easily designed to be an enough size. In addition, the fifth embodiment can have substantially the same advantage as the fourth embodiment.

Figure 14:
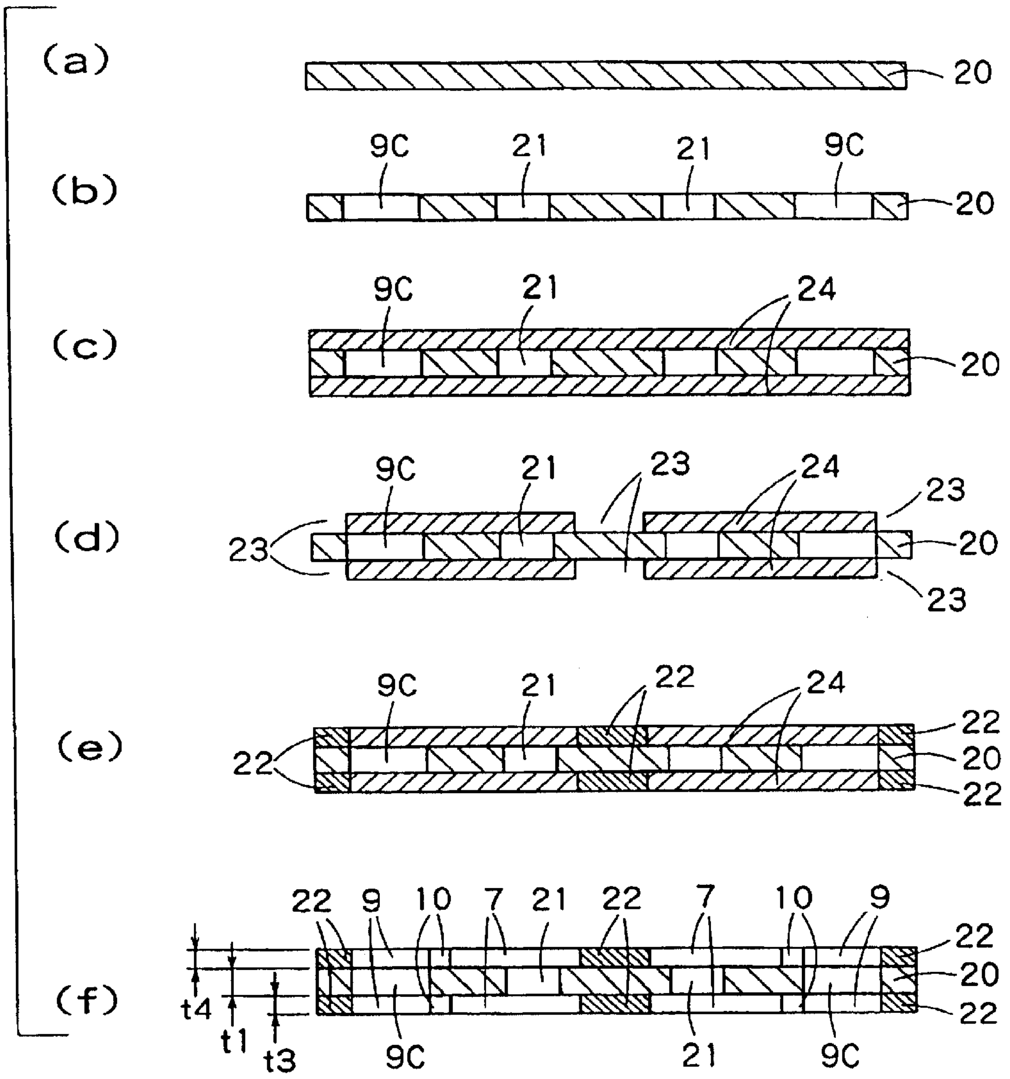
FIG. 14 is a view for explaining steps of a ninth example of a method for producing an ink-jetting recording head according to the invention.

FIG. 14 is a view for explaining a ninth example of a method for producing the ink-jetting recording head according to the invention. The ninth example is for producing the ink-jetting recording head shown in FIG. 13. At first, as shown in FIG. 14(*a*), a substrate 20 is prepared. Then, as shown in FIG. 14(*b*), communication holes 21 and opening portions 9C are formed through the substrate 20 by means of a pressing process, a dry-etching process, a laser-machining process or the like.

Next, as shown in FIG. 14(*c*), a photosensitive resin 24 is applied onto both side surfaces of the substrate 20. Then, as shown in FIG. 14(*d*), the photosensitive resin is exposed and developed together with a conventional patterning (masking tool, so that only respective patterned portions 23 of the both side surfaces of the substrate 20 are exposed. The patterned portions 23 correspond to walls of the respective flowing-path portions 22. Except for the patterned portions 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 14(*e*), nickel or chromium is accumulated on the patterned portions 23 by electrocasting. Thus, the upper and lower flowing-path portions 22 are formed.

Then, as shown in FIG. 14(*f*), the photosensitive resin 24 is completely removed. Then, the respective surfaces of the flowing-path portions 22 are ground so that respective thicknesses t3 and t4 of the flowing-path portions 22 are adjusted to predetermined uniform thicknesses. Thus, the flowing-path plate 4 is completed.

Preferably, t3 is equal to t4 (t3=t4). In the case, remaining stresses in the respective flowing-path portions 22 may be evenly balanced after the electrocasting step. Thus, the warp of the flowing-path plate 4 may be prevented more extremely.

In the method shown in FIG. 14, the respective thicknesses t3 and t4 of the two flowing-path portions 22 may be allowed to be thinner than the case of only a single flowing-path portion 22. Thus, the electrocasting step maybe shortened. In addition, preferably, the thicknesses t3 and t4 of the flowing-path portions 22 are respectively thinner than the thickness t1 of the substrate 20.

Other steps are substantially the same as the first example described above. The ninth example can achieve substantially the same effect as the first example.

Figure 15:
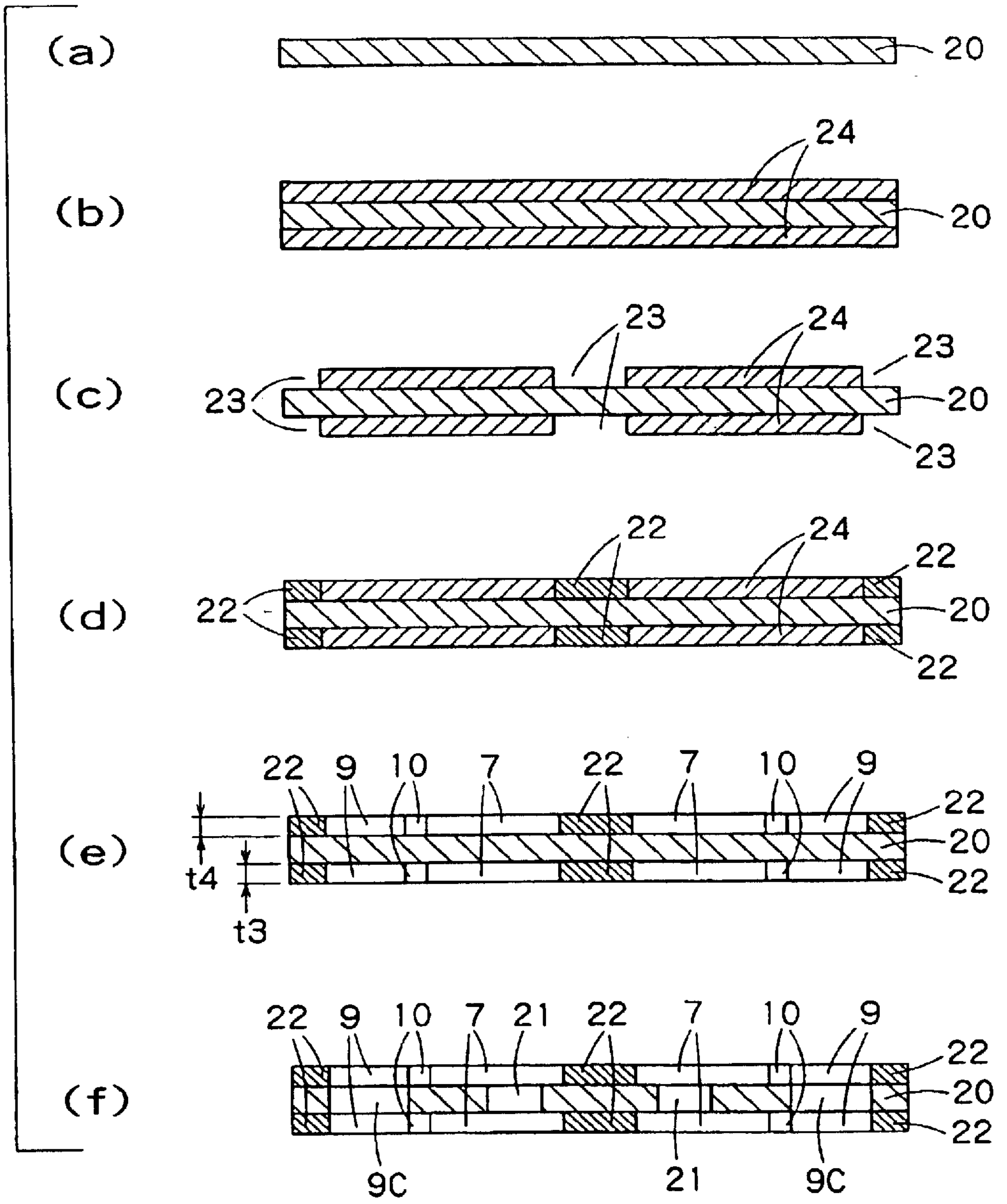
FIG. 15 is a view for explaining steps of a tenth example of a method for producing an ink-jetting recording head according to the invention.

FIG. 15 is a view for explaining an tenth example of a method for producing the ink-jetting recording head according to the invention. The tenth example is also for producing the ink-jetting recording head shown in FIG. 13. In the tenth example, at first, as shown in FIG. 15(*a*), a substrate 20 is prepared.

Next, as shown in FIG. 15(*b*), a photosensitive resin 24 is applied onto both side surfaces of the substrate 20. Then, as shown in FIG. 15(*c*), the photosensitive resin is exposed and developed together with a conventional patterning (masking) tool, so that only respective patterned portions 23 of the both side surfaces of the substrate 20 are exposed. The patterned portions 23 correspond to walls of respective flowing-path portions 22. Except for the patterned portions 23, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 15(*d*), nickel or chromium is accumulated on the patterned portions 23 by electrocasting. Thus, the upper and lower flowing-path portions 22 are formed.

Then, as shown in FIG. 15(*e*), the photosensitive resin 24 is completely removed. Then, the respective surfaces of the flowing-path portions 22 are ground so that respective thicknesses, t3 and t4 of the flowing-path portions 22 are adjusted to predetermined uniform thicknesses. Thus, the flowing-path plate 4 is completed.

After that, as shown in FIG. 15(*f*), communication holes 21 and, opening portions 9C are formed through the substrate 20 by means of a pressing process, a dry-etching process, a laser-machining process or the like.

Other steps are substantially the same as the first example described above. The tenth example can achieve substantially the same effect as the first example.

Figure 16:
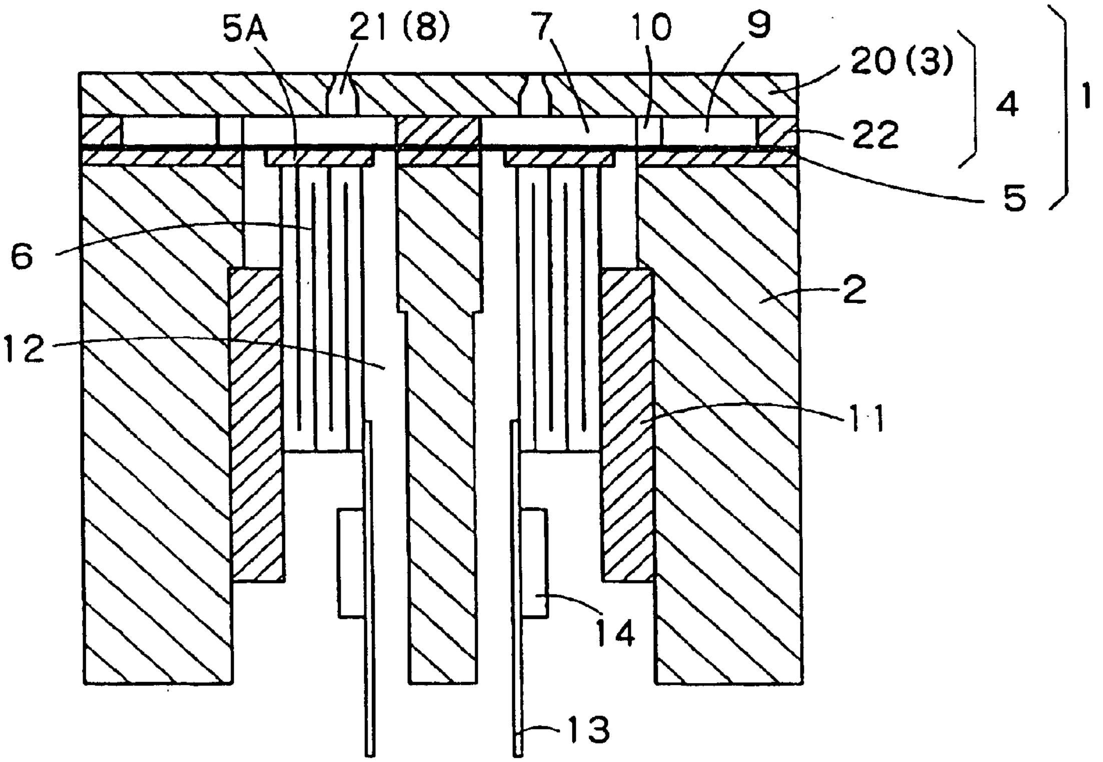
FIG. 16 is a schematic longitudinal sectional view of an ink-jetting recording head of a sixth embodiment according to the invention.

FIG. 16 shows a sixth embodiment of an ink-jetting recording head according to the invention. In the ink-jetting recording head, the substrate 20 and the nozzle plate 3 are integrated (unified) into one piece. That is, the communication holes 21 of the substrate 20 and the nozzles 8 of the nozzle plate 3 are integrated (unified). Other structure is substantially the same as the first embodiment shown in FIG. 1. In the sixth embodiment, the same numeral references correspond to the same elements as the first embodiment. The explanation of the same elements is not repeated.

According to the sixth embodiment, the number of parts and the number of steps for producing the head may be reduced. Thus, the accuracy of the head may be improved more, and the cost thereof may be reduced more. In addition, the sixth embodiment can have, substantially the same advantage as the first embodiment.

Figure 17:
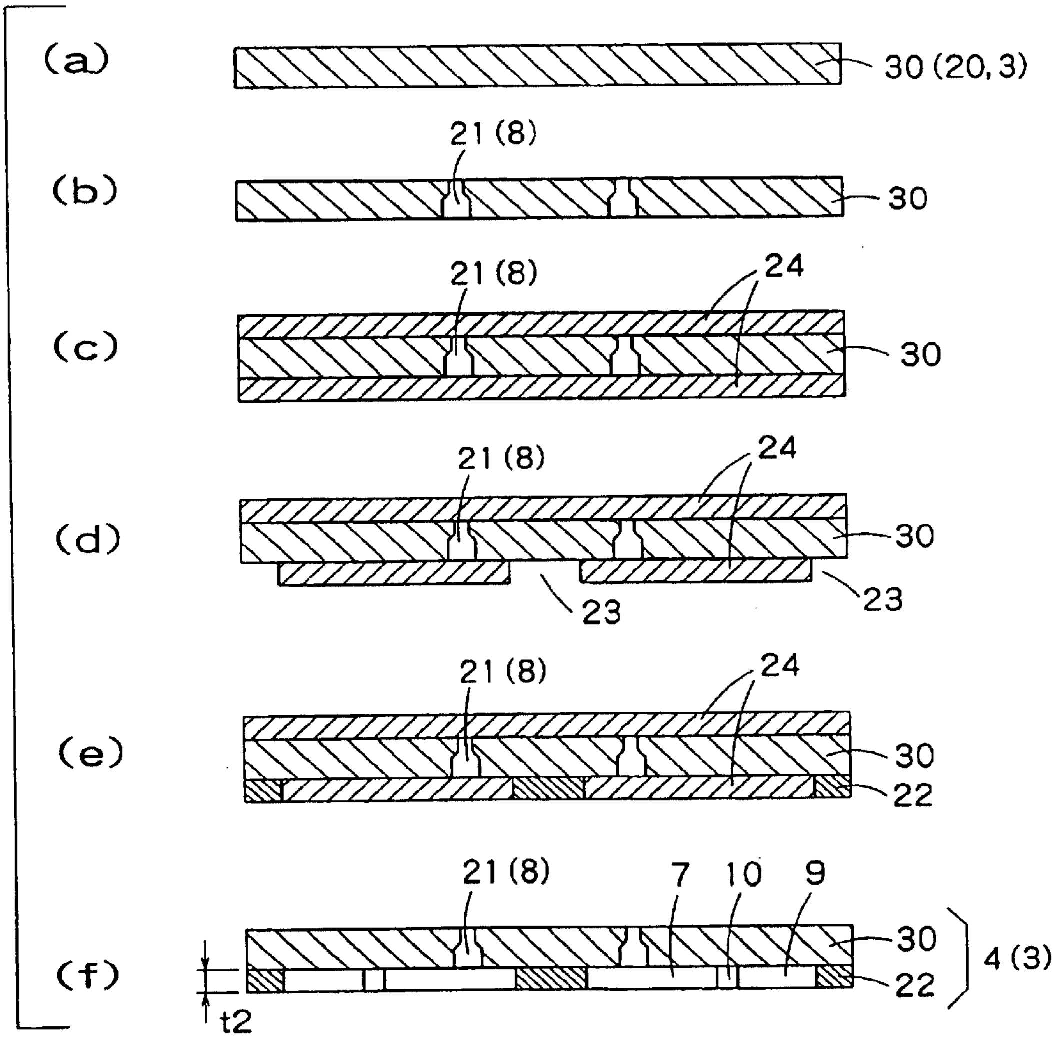
FIG. 17 is a view for explaining steps of a eleventh example of a method for producing an ink-jetting recording head according to the invention.

FIG. 17 is a view for explaining an eleventh example of a method for producing the ink-jetting recording head according to the invention. The eleventh example is for producing the ink-jetting recording head shown in FIG. 16. At first, as shown in FIG. 17(*a*), a plate 30 into which a substrate 20 and a nozzle plate 3 are integrated is prepared. Then, as shown in FIG. 17(*b*), communication holes 21 (nozzles 8) are formed through the plate 30 by means of a pressing process, a dry-etching process, a laser-machining process or the like.

Next, as shown in FIG. 17(*c*), a photosensitive resin 24 is applied onto both side surfaces of the substrate plate 30. Then, as shown in FIG. 17(*d*), the photosensitive resin is exposed and developed together with a conventional patterning (masking) tool, so that only a patterned portion 23 of a lower surface of the substrate plate 30 is exposed. The patterned, portion 23 corresponds to walls of a flowing-path portion 22. Except for the patterned portion 23, the both side surfaces of the substrate plate 30 are masked.

Next, the substrate plate 30 is immersed in the electrocasting bath. Then, a direct-current voltage is applied to the electrocasting bath while using the substrate plate 30 as a cathode. Thus, as shown in FIG. 17(*e*), nickel or chromium is accumulated on the patterned portion 23 by electrocasting. Thus, the flowing-path portion 22 is formed.

Then, as shown in FIG. 17(*f*), the photosensitive resin 24 is completely removed. Then, the surface of the flowing-path portion 22 is ground so that a thickness t2 of the flowing-path portion 22 is adjusted to a predetermined uniform thickness.

Thus, the flowing-path plate 4 integrated with the nozzle plate 3 is completed.

Other steps are substantially the same as the first example described above. The eleventh example can achieve substantially the same effect as the first example.

Figure 18:
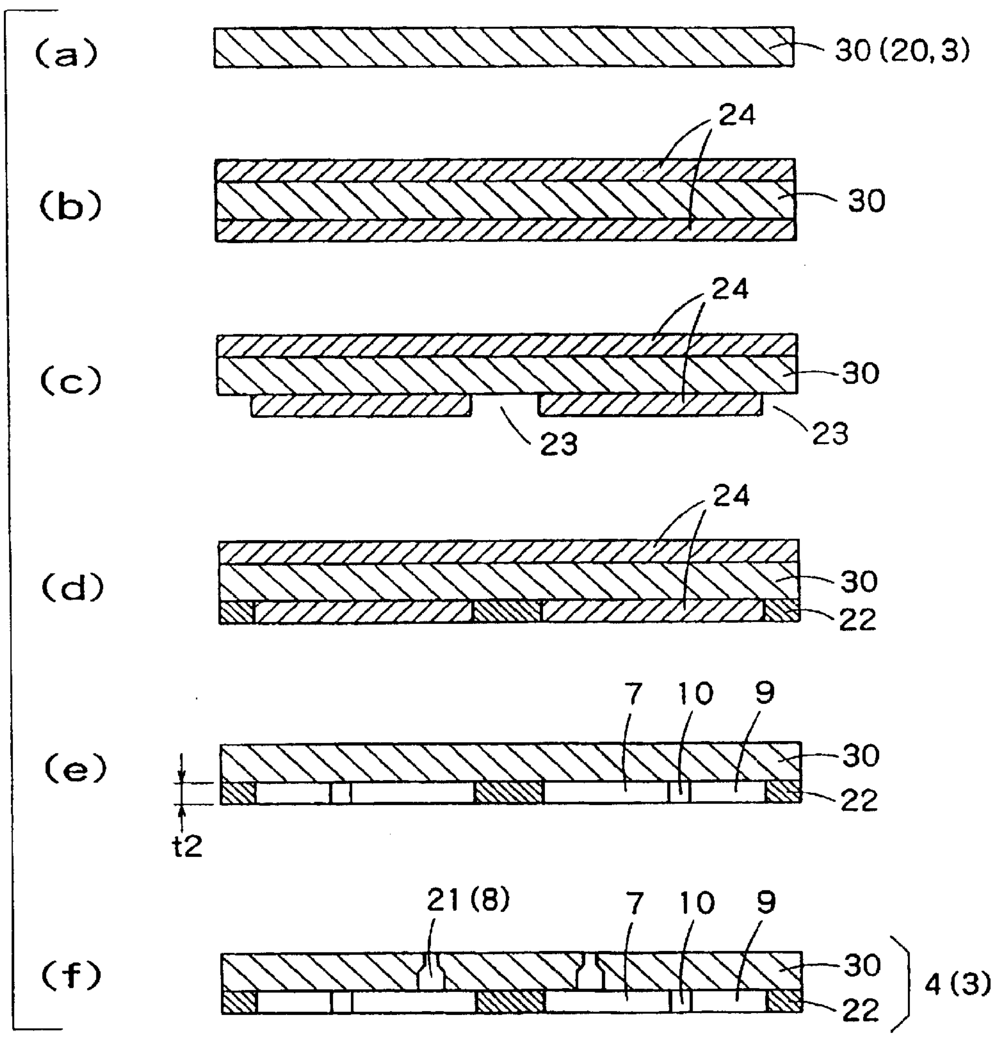
FIG. 18 is a view for explaining steps of a twelfth example of a method for producing an ink-jetting recording head according to the invention.

FIG. 18 is a view for explaining a twelfth example of a method for producing the ink-jetting recording head according to the invention. The twelfth example is also for producing the ink-jetting recording head shown in FIG. 16. In the twelfth example, at first, as shown in FIG. 18(*a*), a plate 30 into which a substrate 20 and a nozzle plate 3 are integrated is prepared.

Next, as shown in FIG. 18(*b*), a photosensitive resin 24 is applied onto both side surfaces of the substrate plate 30. Then, as shown in FIG. 18(*c*), the photosensitive resin is exposed and developed together with a conventional patterning (masking) tool, so that only a patterned portion 23 of a lower surface of the substrate plate 30 is exposed. The patterned portion 23 corresponds to walls of a flowing-path portion 22. Except for the patterned portion 23, the both side surfaces of the substrate plate 30 are masked.

Next, the substrate plate 30 is immersed in the electrocasting bath. Then, a direct-current voltage is applied to the electrocasting bath while using the substrate plate 30 as a cathode. Thus, as shown in FIG. 18(*d*), nickel or chromium is accumulated on the patterned portion 23 by electrocasting. Thus, the flowing-path portion 22 is formed.

Then, as shown in FIG. 18(*e*), the photosensitive resin 24 is completely removed. Then, the surface of the flowing-path portion 22 is ground so that a thickness t2 of the flowing-path portion 22 is adjusted to a predetermined uniform thickness. Thus, the flowing-path plate 4 integrated with the nozzle plate 3 is formed.

After that, as shown in FIG. 18(*f*), communication holes 21 (nozzles 8) are formed through the flowing-path plate 4 by means of a pressing process, a dry-etching process, a laser-machining process or the like.

Other steps are substantially the same as the first example described above. The twelfth example can achieve substantially the same effect as the first example.

Figure 19:
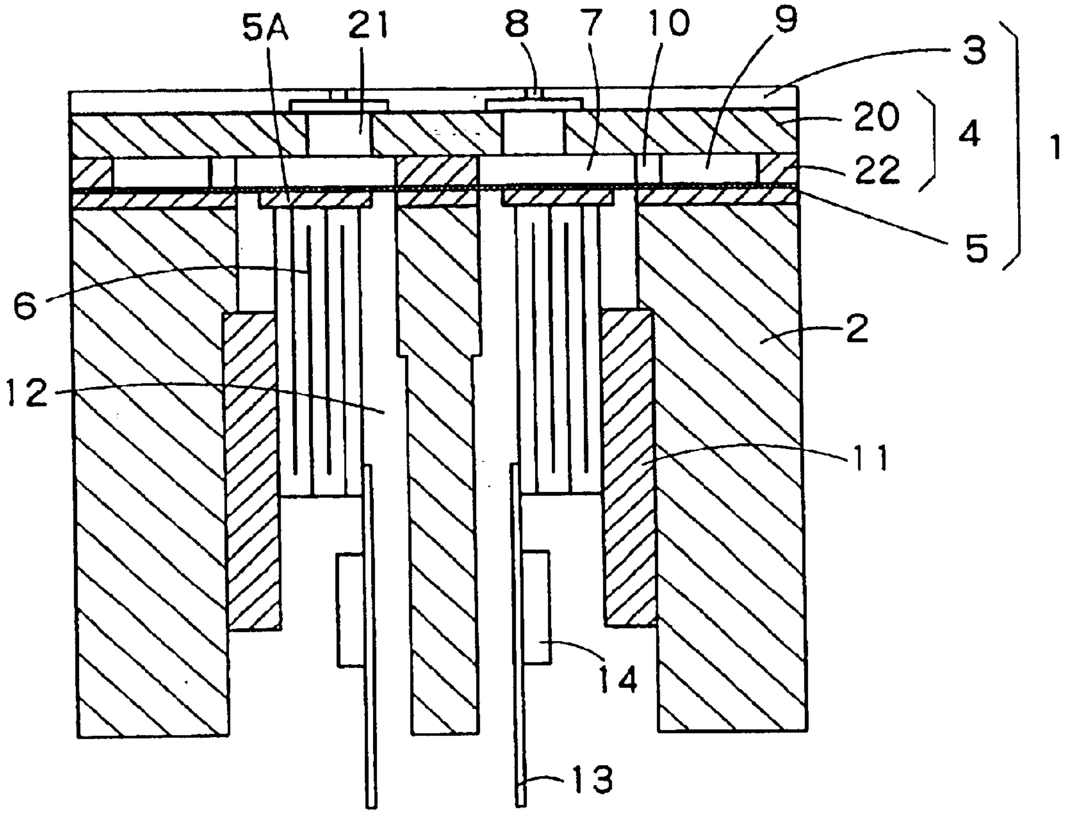
FIG. 19 is a schematic longitudinal sectional view of an ink-jetting recording head of a seventh embodiment according to the invention.

FIG. 19 shows a seventh embodiment of an ink-jetting recording head according to the invention. In the ink-jetting recording head, the nozzle plate 3 is formed by electrocasting on the flowing-path plate 4 that has been produced according to the method explained above with reference to FIG. 2 or FIG. 3. Other structure is substantially the same as the first embodiment shown in FIG. 1. In the seventh embodiment, the same numeral references correspond to the same elements as the first embodiment. The explanation of the same elements is not repeated.

According to the seventh embodiment, the nozzle plate 3 may be mounted onto the flowing-path plate 4 during a continuous electrocasting step. In addition, the seventh embodiment can have substantially the same advantage as the first embodiment.

Figure 20:
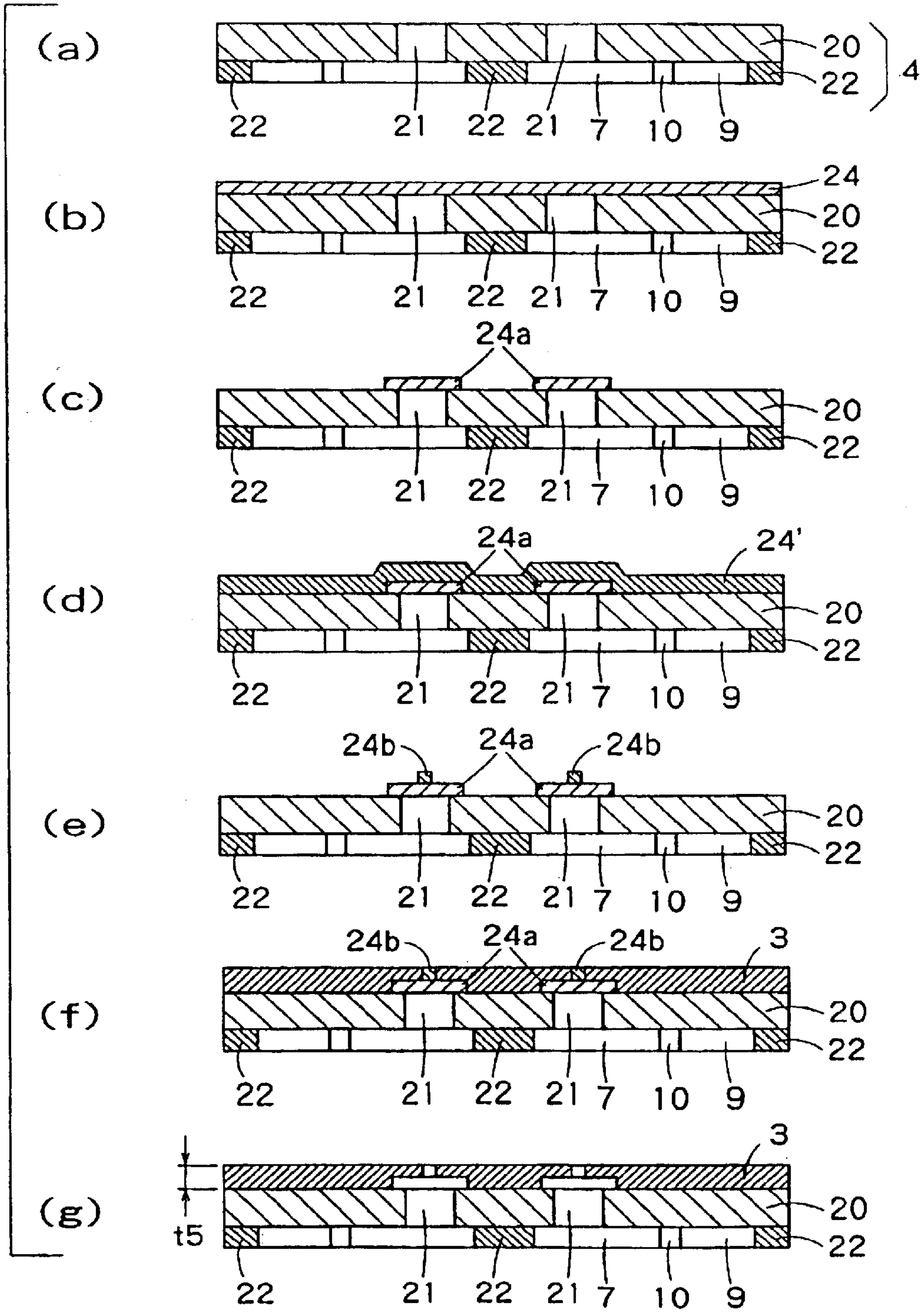
FIG. 20 is a view for explaining steps of a thirteenth example of a method for producing an ink-jetting recording head according to the invention.

FIG. 20 is a view for explaining a thirteenth example of a method for producing the ink-jetting recording head according to the invention. The thirteenth example is for producing the ink-jetting recording head shown in FIG. 19. In the thirteenth example, at first, as shown in FIG. 20(*a*), a completed flowing-path plate 4 is prepared.

Next, as shown in FIG. 20(*b*), a photosensitive resin 24 is applied onto a surface on a side of the substrate 20 of the flowing-path plate 4. Then, as shown in FIG. 20(*c*), the photosensitive resin 24 is exposed and developed together with a conventional patterning (masking) tool, so that only a first patterned photosensitive resin 24*a* remains for sealing the communication holes 21.

Furthermore, as shown in FIG. 20(*d*), a photosensitive resin 24' is applied onto the surface on the side of the substrate 20 of the flowing-path plate 4 over the first patterned photosensitive resin 24*a*. Then, as shown in FIG. 20(*e*), the photosensitive resin 24' is exposed and developed to a ether with a conventional patterning (masking) tool, so that only a second patterned photosensitive resin 24*b* corresponding to the nozzles 8 remains on the first patterned photosensitive-resin 24*a*.

Next, the flowing-path plate 4 is immersed in an electrocasting bath. Then, a direct-current voltage is applied to the electrocasting bath while using the flowing-path plate 4 as a cathode. Thus, as shown in FIG. 20(*f*), nickel or chromium is accumulated by electrocasting on a portion corresponding to the nozzle plate that defines and surrounds the nozzles 8. Thus, the nozzle plate 3 is formed.

Then, as shown in FIG. 20(*g*), the photosensitive resin 24*a* and 24*b* are completely removed. Then, the surface of the nozzle plate 3 is ground so that a thickness t5 of the nozzle plate 3 is adjusted to a predetermined uniform thickness. Thus, the predetermined nozzle plate 3 is formed on the flowing-path plate 4.

Other steps are substantially the same as the first example described above. The thirteenth example can achieve substantially the same effect as the first example.

In addition, if the flowing-path plate 4 is formed according to the method shown in FIG. 3, the nozzle plate 3 can be formed by electrocasting onto the flowing-path plate 4 at a state of FIG. 3(*e*), that is, before the communication holes 21 are formed. In the case, it become unnecessary for the first patterned photosensitive resin 24*a* to be formed for sealing the communication holes 21 as shown in FIG. 20. That is, it becomes unnecessary to form two layers of the photosensitive resin in order to form the nozzles 8. Thus, the electrocasting for the nozzle plate 3 and the electrocasting for the flowing-path portion 22 may be conducted at the same time.

Figure 21:
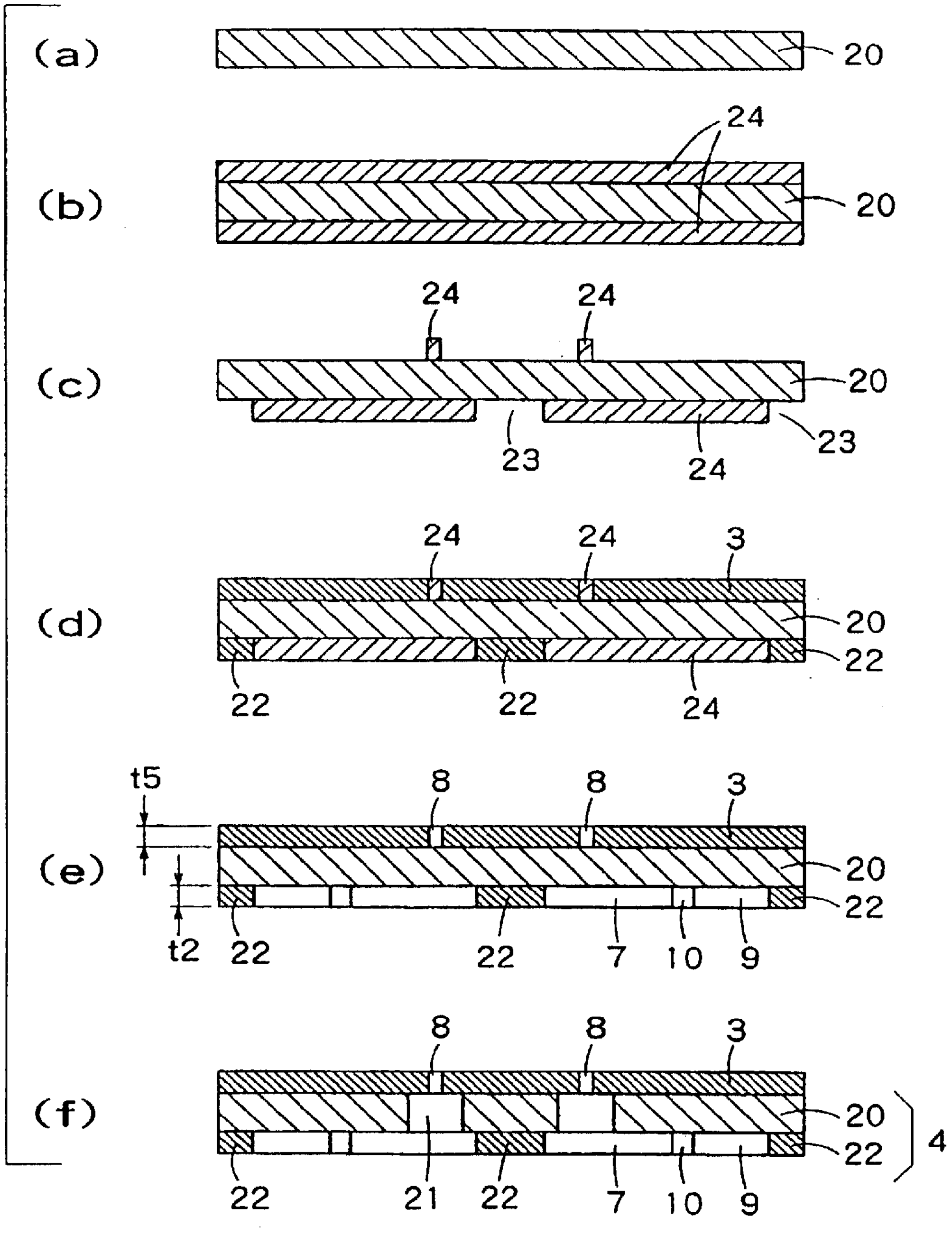
FIG. 21 is a view for, explaining steps of a fourteenth example of a method for producing an ink-jetting recording head according to the invention.

FIG. 21 is a view for explaining a fourteenth example of a method for producing the ink-jetting recording head according to the invention, wherein the electrocasting for the nozzle plate 3 and the electrocasting for the flowing-path portion 22 are conducted at the same time. The fourteenth example shown in FIG. 21 is for producing the ink-jetting recording head shown in FIG. 1. In the fourteenth example, at first, as shown in FIG. 21(*a*), a substrate 20 is prepared.

Next, as shown in FIG. 21(*b*), a photosensitive resin 24 is applied onto both side surfaces of the substrates 20. Then, as shown in FIG. 21(*c*), the photosensitive resin is exposed and developed together with a conventional patterning (masking) tool, so that a patterned portion 23 of a lower surface of the substrate 20 and a portion corresponding to the nozzle plate, which defines and surrounds the nozzles 8, of an upper-surface of the substrate 20 are exposed. The patterned portion 23 corresponds to walls of a flowing-path portion 22. Except for the patterned portion 23 and the portion corresponding to the nozzle plate, the both side surfaces of the substrate 20 are masked.

Next, the substrate 20 is immersed in the electrocasting bath. Then, a direct-current voltage is applied to the electrocasting bath while using the substrate 20 as a cathode. Thus, as shown in FIG. 21(*d*), nickel or chromium is accumulated by electrocasting on the patterned portion 23 and the portion corresponding to the nozzle plate. Thus, the flowing-path portion 22 and the nozzle plate 3 are formed.

Then, as shown in FIG. 21(*e*), the photosensitive resin 24 is completely removed. Then, the surface of the flowing-path portion 22 is ground so that a thickness t2 of the flowing-path portion 22 is adjusted to a predetermined uniform thickness. Similarly, the surface of the nozzle plate 3 is ground so that a thickness t5 of the nozzle plate 3 is adjusted to a predetermined uniform thickness. Thus, the flowing-path plate 4 integrated with the nozzle plate 3 is formed.

After that, as shown in FIG. 21(*f*), communication holes 21 are formed through the substrate 20 by means of a dry-etching process, a laser-machining process or the like.

Figure 22A:
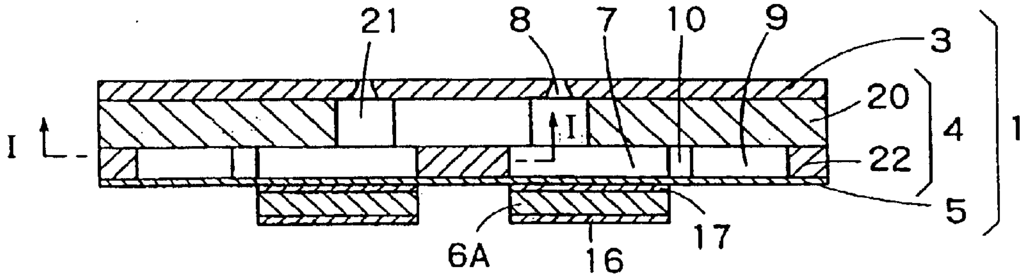
FIG. 22A is a schematic longitudinal sectional view of an ink-jetting recording head of a eighth embodiment according to the invention.
Figure 22B:
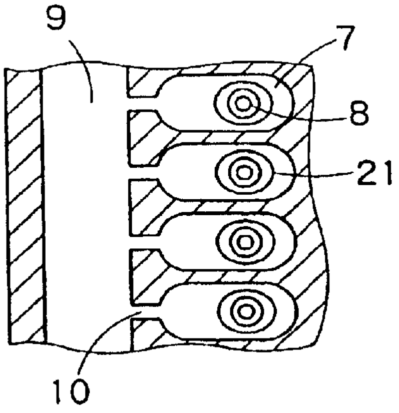
FIG. 22B is a schematic sectional view taken along A—A line of FIG. 22A.

FIGS. 22A and 22B show an eighth embodiment of an ink-jetting recording head according to the invention. The ink-jetting recording head includes bending-vibration type of piezoelectric vibrating members 6A. Each of the piezoelectric vibrating members 6A is sandwiched between an upper electrode 16 and a lower electrode 17, and attached to the vibrating plate 5 of the flowing-path unit 1.

In the recording head, when a driving signal is inputted to a piezoelectric vibrating member 6A, the piezoelectric vibrating member 6A bends in a lateral direction thereof to change a pressure of the ink in the corresponding pressure chamber 7. Thus, the ink in the pressure chamber 7 may be jetted from the corresponding nozzle 8 as a drop of the ink. Other structure is substantially the same as the first embodiment shown in FIG. 1. In the eighth embodiment, the same numeral references correspond to the same elements as the first embodiment. The explanation of the same elements is not repeated. The eighth embodiment can have substantially the same advantage as the first embodiment.

Figure 23A:
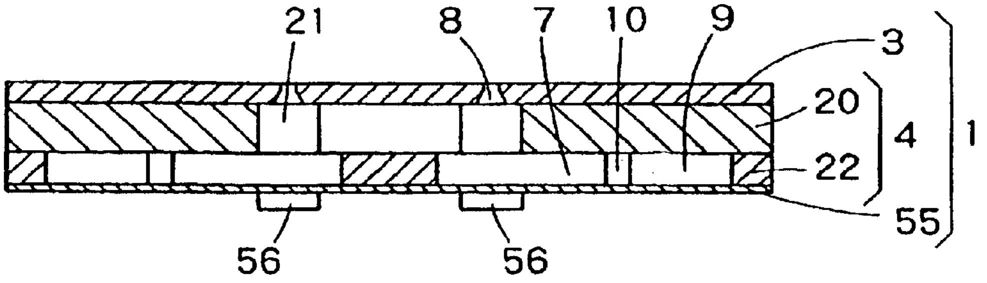
FIG. 23A is a schematic longitudinal sectional view of an ink-jetting recording head of a ninth embodiment according to the invention.

FIG. 23A shows a ninth embodiment of an ink-jetting recording head according to the invention. The ink-jetting recording head includes heaters 56 instead of the piezoelectric vibrating members. The flowing-path unit 1 includes a thermal conducive plate 55 instead of the vibrating plate. Each of the heaters 56 is attached to a portion of the thermal conductive plate 55 corresponding to each of the pressure chambers 7.

In the recording head, when a driving signal is inputted to a heater 56, the heater 56 is heated to generate an air bubble in the ink in the corresponding pressure chamber 7. Because of further heating of the heater 56 or the like, the size of the air bubble may be controlled to change a pressure of the ink in the corresponding pressure chamber 7. Thus, the ink in the pressure chamber 7 may be jetted from the corresponding nozzle 8 as a drop of the ink. Other structure is substantially the same as the first embodiment shown in FIG. 1. In the ninth embodiment, the same numeral references correspond to the same elements as the first embodiment. The explanation of the same elements is not repeated. The ninth embodiment can have substantially the same advantage as the first embodiment.

Figure 23B:
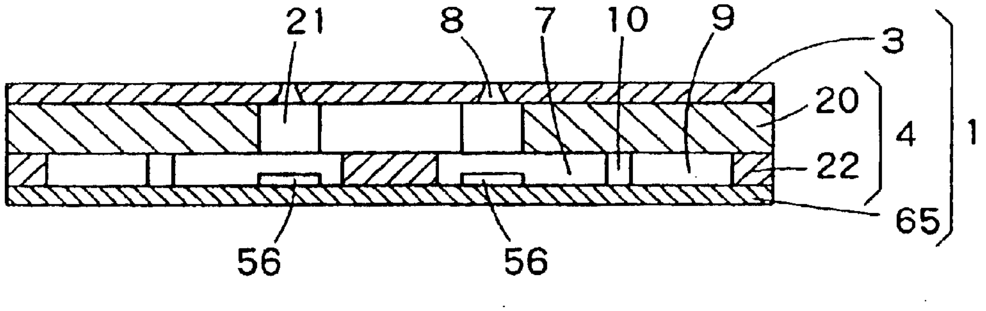
FIG. 23B is a schematic longitudinal sectional view of an ink-jetting recording head of a tenth embodiment according to the invention.
Figure 24:
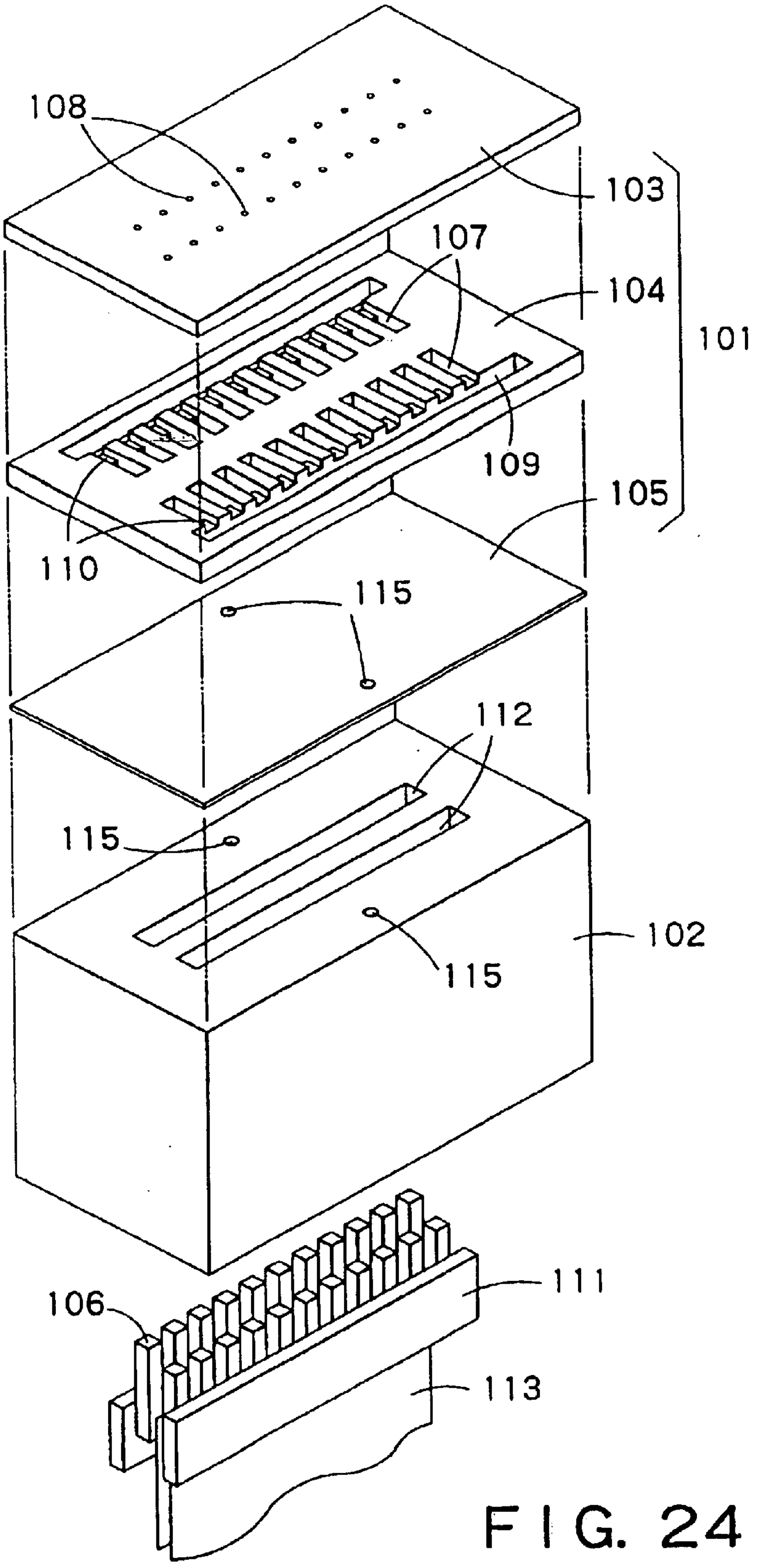
FIG. 24 PRIOR ART
FIG. 24 is a schematic exploded perspective view of a conventional ink-jetting recording head.
Figure 25:
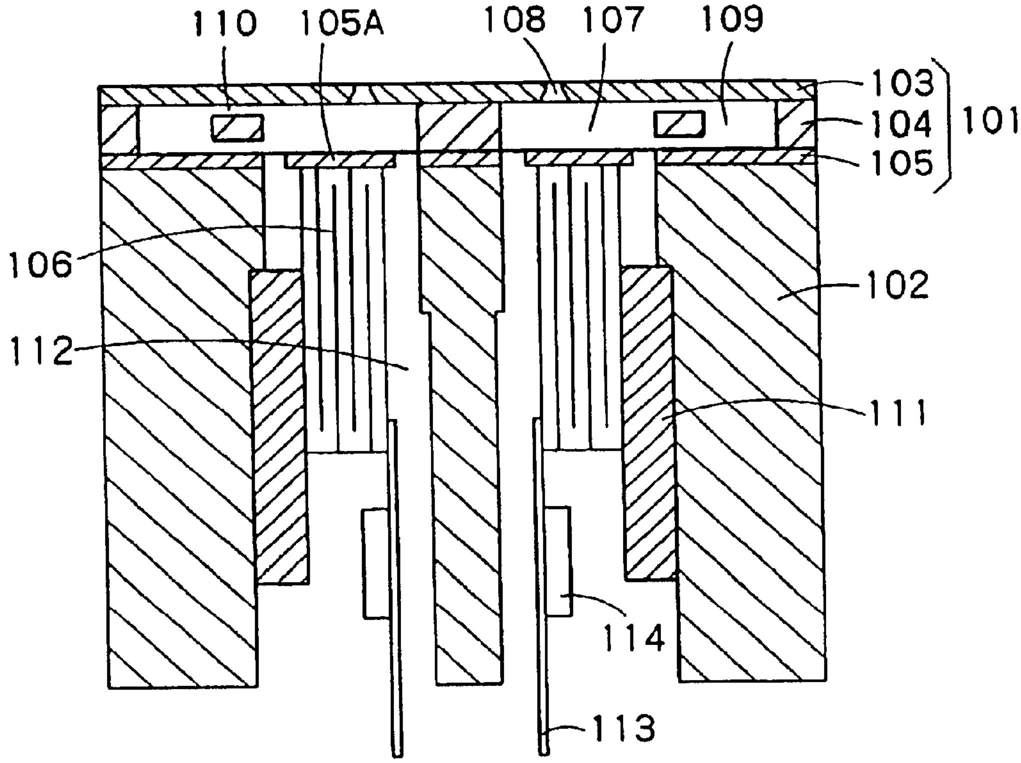
F I G. 25 PRIOR ART
FIG. 25 is a schematic longitudinal sectional view of the ink-jetting recording head of FIG. 24.

FIG. 23B shows a tenth embodiment of an ink-jetting recording head according to the invention. The ink-jetting recording head includes a silicon plate 65 instead of the thermal conductive plate. Each of the heaters 56 is attached to an upper surface of the silicon plate 65. The tenth embodiment can have substantially the same advantage as the ninth embodiment.

The above description is given for the ink-jetting recording head as a liquid jetting apparatus according to the invention. However, this invention is intended to apply to general liquid jetting apparatuses widely. A liquid may be glue, bonding agent, nail polish or the like, instead of the ink.

According to the invention, since the portion of the other side of the flowing-path plate is formed by electrocasting, a "warp" of the flowing-path plate may be prevented. Thus, the flowing-path plate may be formed more accurately. In addition, since the portion formed by electrocasting includes at least a portion of the pressure-chamber space, preferably the whole pressure-chamber space, boundary walls defining the pressure-chamber space may have a relatively higher rigidity. Thus, the pressure-chamber spaces may be arranged more densely.

Therefore, the, liquid jetting head is advantageous in being made denser, made more accurate, and enlarged.

In addition, since the pressure-chamber space is formed as a portion of the flowing-path space, the pressure-chamber space may be easily positioned relative to the nozzle. Thus, it may be prevented that an air bubble is generated and stays in the flowing-path space. In addition, a step of peeling off the electrocasting portion is unnecessary, which is advantageous in cost.

What is claimed is:

1. A method of producing a liquid jetting head, including:

a flowing-path plate having a through hole where a flowing-path space is formed as a flowing-path for a liquid;

a nozzle plate provided on one side surface of the flowing-path plate, said nozzle plate having a nozzle that is communicated with the flowing-path space; and a sealing plate provided on the other side surface of the flowing-path plate for sealing the flowing-path space;

wherein:

a portion of the other side of the flowing-path space forms a pressure-chamber space;

a portion of the other side of the flowing-path plate including at least a portion of the pressure-chamber space is formed by electrocasting;

a pressure-generating unit is provided at a portion of the other side of the sealing plate corresponding to the pressure-chamber space for changing a pressure of the liquid in the pressure-chamber space; and the flowing-path plate has a substrate layer and an electrocasting layer formed on the other side surface of the substrate layer by electrocasting;

the method comprising:

a pattern-forming step of forming and sticking a pattern corresponding to a portion of the flowing-path space in the portion of the other side of the flowing-path plate onto the other side surface of the substrate layer, an electrocasting step of forming the portion of the other side of the flowing-path plate onto the other side surface of the substrate layer by electrocasting in such a manner that the pattern is covered, and a pattern-removing step of removing the pattern in order to form the portion of the flowing-path space in the portion of the other side of the flowing-path plate.

2. The method of producing a liquid jetting head according, to claim 1, wherein the pattern-forming step comprises:

a step of applying a photosensitive resin to the other side surface of the substrate layer, and a step of exposing and developing the applied photosensitive resin according to said pattern.

3. The method of producing a liquid jetting head according to claim 1, further comprising a grinding step of grinding the other side surface of the flowing-path plate, after the pattern-removing step.

4. The method of producing a liquid jetting head according to claim 1, further comprising a step of forming a communicating hole in the substrate layer for connecting the pressure-chamber space and the nozzle, before the pattern-forming step.

5. The method of producing a liquid jetting head according to claim 1, further comprising a step of forming a communicating hole in the substrate layer for connecting the pressure-chamber space and the nozzle, after the pattern-removing step.

* * * * *